US010605575B2

(12) United States Patent
Froom et al.

(10) Patent No.: US 10,605,575 B2
(45) Date of Patent: Mar. 31, 2020

(54) SELF-DEFENSE DEVICE FOR HANDHELD ELECTRONIC DEVICES

(71) Applicants: Seth Froom, Baton Rouge, LA (US); Trevor Reeves, Baton Rouge, LA (US); Sean Simone, Baton Rouge, LA (US)

(72) Inventors: Seth Froom, Baton Rouge, LA (US); Trevor Reeves, Baton Rouge, LA (US); Sean Simone, Baton Rouge, LA (US)

(73) Assignee: YELLOW JACKET, LLC, Baton Rouge, LA (US)

( * ) Notice: Subject to any disclaimer, the term of this patent is extended or adjusted under 35 U.S.C. 154(b) by 101 days.

(21) Appl. No.: 14/584,840

(22) Filed: Dec. 29, 2014

(65) Prior Publication Data

US 2019/0212104 A1 Jul. 11, 2019

Related U.S. Application Data

(63) Continuation-in-part of application No. 13/662,256, filed on Oct. 26, 2012, now Pat. No. 8,934,213.

(Continued)

(51) Int. Cl.
| | |
|---|---|
| *F41H 13/00* | (2006.01) |
| *A45C 15/00* | (2006.01) |
| *H04M 1/21* | (2006.01) |
| *A45C 11/00* | (2006.01) |
| *H04M 1/02* | (2006.01) |
| *A45F 5/00* | (2006.01) |
| *H04M 1/03* | (2006.01) |

(Continued)

(52) U.S. Cl.
CPC ......... *F41H 13/0018* (2013.01); *A45C 11/00* (2013.01); *A45C 15/00* (2013.01); *H04M 1/21* (2013.01); *A45C 2011/002* (2013.01); *A45F 5/00* (2013.01); *A45F 2200/0516* (2013.01); *A45F 2200/0591* (2013.01); *H04M 1/026* (2013.01); *H04M 1/03* (2013.01); *H04M 1/04* (2013.01); *H04M 1/185* (2013.01); *H04M 1/72527* (2013.01)

(58) Field of Classification Search
CPC ..... F41H 13/0018; A45C 15/00; A45C 11/00; A45C 2011/002; A45F 2200/0591; A45F 5/00; A45F 2200/0516; H04M 1/03; H04M 1/21; H04M 1/72527; H04M 1/04; H04M 1/185; H04M 1/026
USPC ....................................................... 361/232
See application file for complete search history.

(56) References Cited

U.S. PATENT DOCUMENTS 5,988,450 A * 11/1999 Cassarino ................ F41H 9/10
222/192
6,022,120 A * 2/2000 Chang ..................... F21V 33/00
361/232

(Continued)

*Primary Examiner* — Dharti H Patel
(74) *Attorney, Agent, or Firm* — Roy Kiesel Ford Doody & North, APLC

(57) ABSTRACT

A two-part self-defense apparatus is disclosed. The apparatus is configured for use with a handheld electronic device such as a cellular phone. A removable protective case configured for installation on the handheld electronic device is one part of the apparatus, and a self-defense module containing a self-defense weapon is the other part. The two parts may be connected to form a unitary working unit, and may be disconnected when the self-defense module is not needed or desired. In a preferred embodiment, the self-defense weapon is a stun gun and the handheld electronic device is a cellular phone.

18 Claims, 23 Drawing Sheets

Related U.S. Application Data

(60) Provisional application No. 61/709,968, filed on Oct. 4, 2012, provisional application No. 61/625,941, filed on Apr. 18, 2012.

(51) Int. Cl.
  *H04M 1/725* (2006.01)
  *H04M 1/04* (2006.01)
  *H04M 1/18* (2006.01)

(56) References Cited

U.S. PATENT DOCUMENTS

| | | | |
|---|---|---|---|
| 6,635,975 B2* | 10/2003 | Hsieh | F41H 13/0018 |
| | | | 307/326 |
| 7,457,636 B2* | 11/2008 | Kroll | H04B 1/3833 |
| | | | 455/550.1 |
| 7,483,715 B2* | 1/2009 | Kroll | H04B 1/3833 |
| | | | 455/550.1 |
| D682,980 S * | 5/2013 | Sheikh | D22/117 |
| 2010/0203920 A1* | 8/2010 | Gregory | G08B 21/02 |
| | | | 455/556.1 |
| 2013/0092565 A1* | 4/2013 | Swope | F41H 13/0018 |
| | | | 206/216 |

* cited by examiner

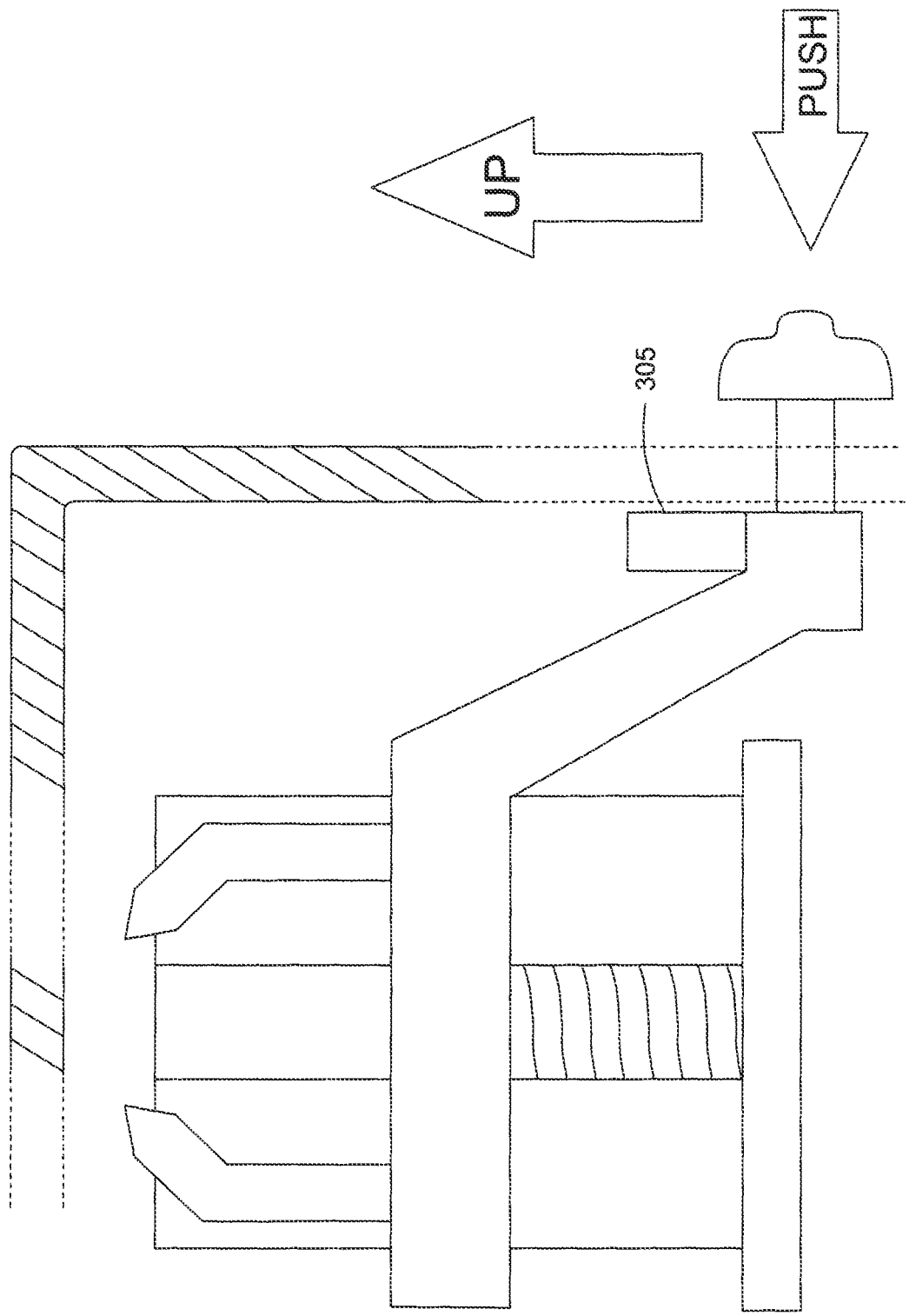

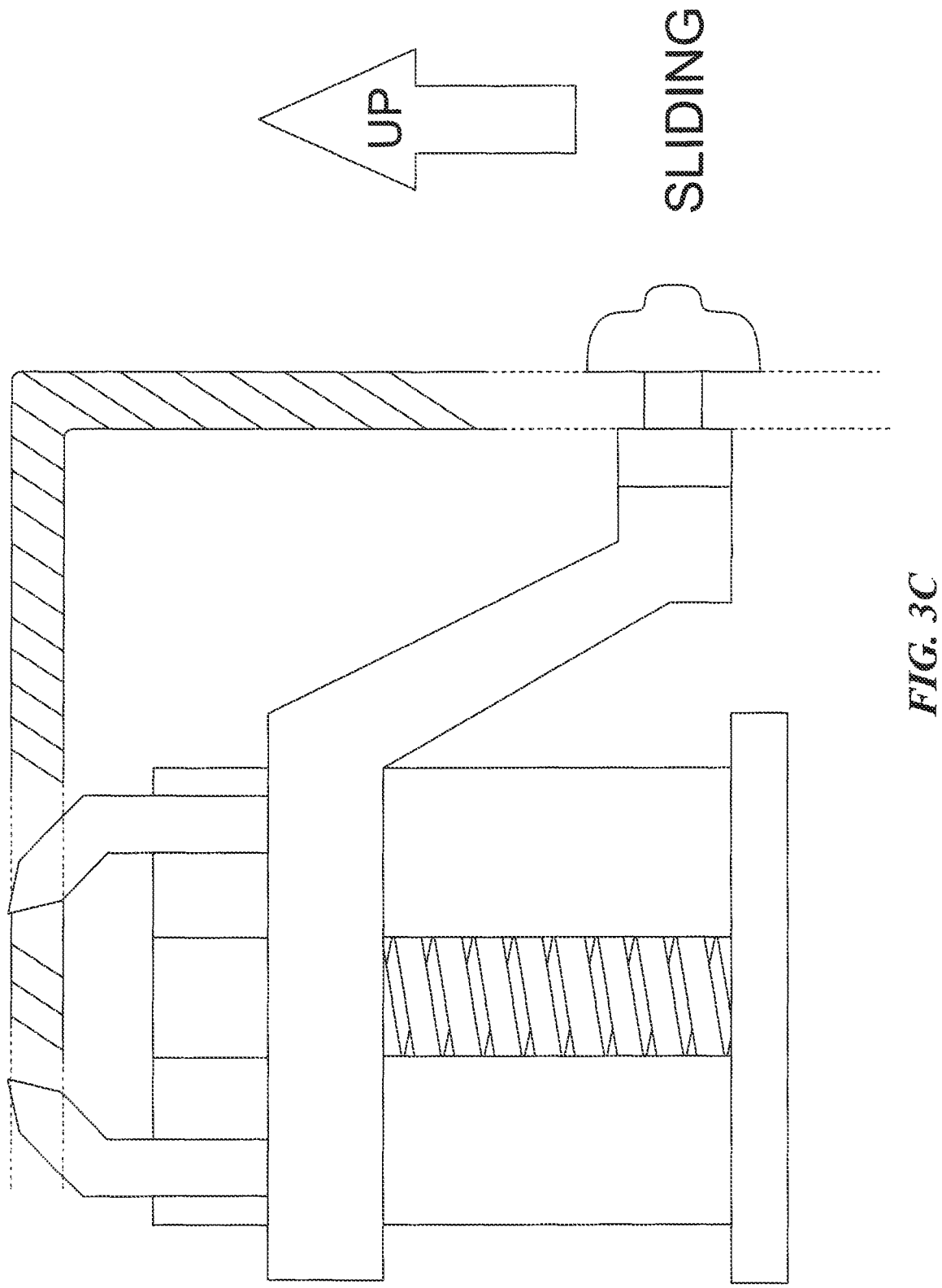

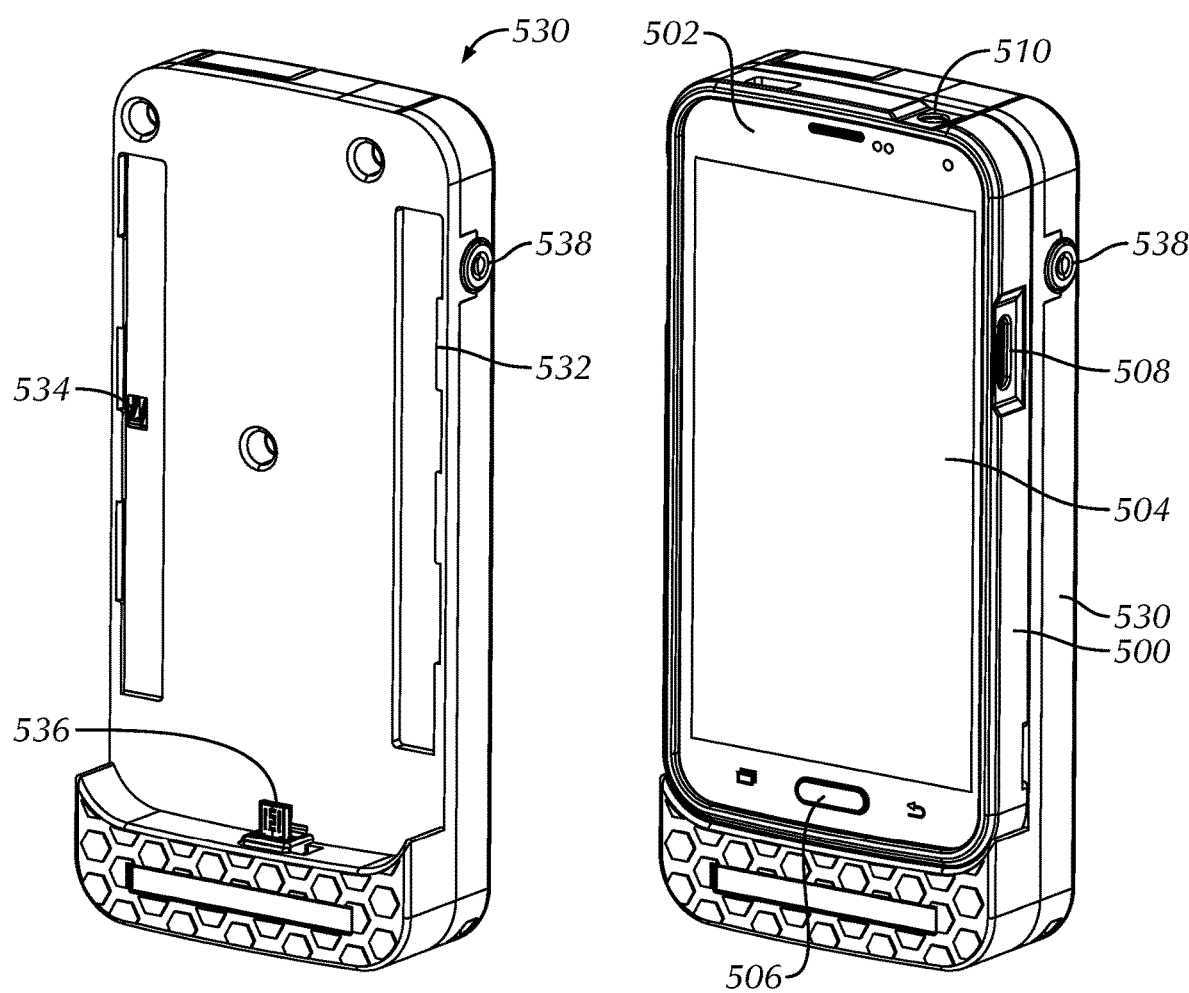
*FIG. 10A*  *FIG. 10B*

SELF-DEFENSE DEVICE FOR HANDHELD ELECTRONIC DEVICES

CROSS-REFERENCE TO RELATED APPLICATION

This application claims priority to U.S. application Ser. No. 13/662,256, entitled ELECTROSHOCK ACCESSORY FOR MOBILE DEVICES, filed on Oct. 26, 2012, an application which claimed priority to U.S. Provisional Application No. 61/709,968, entitled ELECTROSHOCK ACCESSORY FOR MOBILE DEVICES, filed Oct. 4, 2012, and U.S. Provisional Application No. 61/625,941, entitled ELECTROSHOCK WEAPON SYSTEM SMARTPHONE DEVICE CASE, filed Apr. 18, 2012, all of which are hereby incorporated by reference in their entireties.

BACKGROUND OF THE INVENTION

Field of the Invention

This disclosure relates generally to mobile device accessories, and in particular to accessories containing modules providing additional battery capacity and self-defense hardware functionalities for mobile devices.

Background of the Invention

Every year many people are robbed, assaulted, attacked or otherwise find themselves victims of violent crimes. Such crimes include robbery, armed robbery, assault, aggravated assault, assault with a deadly weapon, battery, aggravated battery, manslaughter, 1st, 2nd and 3rd degree murders, and rape. These crimes deprive victims of possessions, and place them in physical harm, immediate danger, and traumatizing situations. For example, victims of sexual assault and extremely violent crimes may never fully recover. Humans have an instinctual natural desire to feel safe and stay free from any potential threat. However in modern day society as population and uncertainty increase, the number of violent crimes increase as well. According to the U.S. Census Bureau, 231,589,260 people were victims of crimes in the United States in 2002.

Many people with mobile devices (e.g. smart phones) are viewed by violent offenders as easy targets with expendable income, thus making them more likely to run into a harmful situation while walking to and from a college class, the library, the grocery store, the mall, local hang-out areas, a bar/club, an empty street/alley or anywhere else that they may be traveling to or from. In these situations, self-defense capability can mean the difference between life and death.

There are a number of self-defense devices and mechanisms currently available on the market, including pepper spray, tear gas, dyes, and personal alarms. There are a number of drawbacks associated with current self-defense devices. One drawback is that people frequently forget to take the device with them and therefore have no access to the device in dangerous situations. Another drawback is the inability to access a defense system quickly enough to respond to an unexpected attack.

BRIEF SUMMARY OF THE INVENTION

One object of this disclosure is to describe a means of self-defense that a person is not likely to leave behind and is quickly accessible. It is also an object of this disclosure to describe an electroshock weapon system capable of incapacitating an aggressive attacker, giving the victim time to escape. Another object of the disclosure is to describe a device that provides moderate protection to the smartphone device due to damage associated with drops or collisions.

The technologies disclosed herein introduces an apparatus for a mobile device. The apparatus includes a housing, an electroshock module and a battery. The housing has a shape adapted to secure the mobile device to the housing. The electroshock module within the housing is configured to release an electric shock. The battery within the housing is configured to supply electrical power to the electroshock module and the mobile device.

A mobile device can include any kind of device that is portable, such as a cellular telephone, e.g. an iPhone or an Android phone, an iPod, a touch screen device, e.g. an iPad, or any type of portable device that has a processor and a memory.

It is common that people carry their smart phones almost everywhere they go. By carrying their smart phones which fit into a case incorporating an electroshock weapon system, people have a means of self-protection capable of stopping attackers. The electroshock weapon system attached to the smart phone is a self-defense device that is easy to use, quick to access, non-lethal and effective. The system increases the safety and security of a person who finds himself/herself in a dangerous situation. The case also covers a user's mobile device and helps to prevent the mobile device from incurring damage due to drops or collisions.

These and other objects, features and characteristics of the present disclosure will become more apparent to those skilled in the art from a study of the following detailed description in conjunction with the appended claims and drawings, all of which form a part of this specification.

BRIEF DESCRIPTION OF THE SEVERAL VIEWS OF THE DRAWING(S)

FIGS. 3A, 3B, 3C and 3D illustrate a sample electrodes ejecting mechanism.

FIG. 10A is a perspective view of a self-defense module in accordance with the present invention.

FIGS. 10B-10D are perspective views of a self-defense module and a protective case, wherein the protective case is secured to the self-defense module, and a handheld electronic device is installed within the protective case.

DETAILED DESCRIPTION OF THE INVENTION

References in this description to "an embodiment", "one embodiment", or the like, mean that the particular feature, function, or characteristic being described is included in at least one embodiment of the present disclosure. Occurrences of such phrases in this description do not necessarily all refer to the same embodiment, nor are they necessarily mutually exclusive.

Figure 1A:
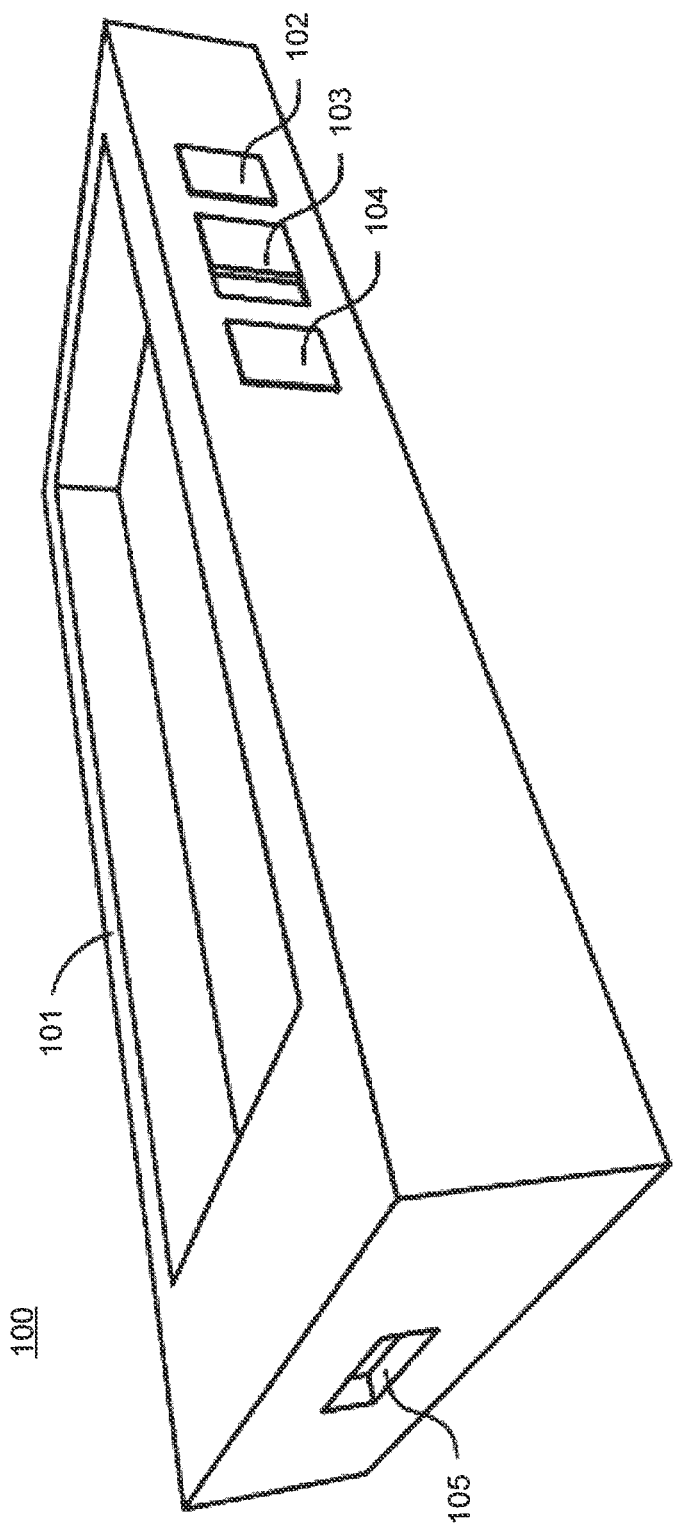
FIGS. 1A and 1B illustrate a device according to one embodiment of the present invention.
Figure 1B:
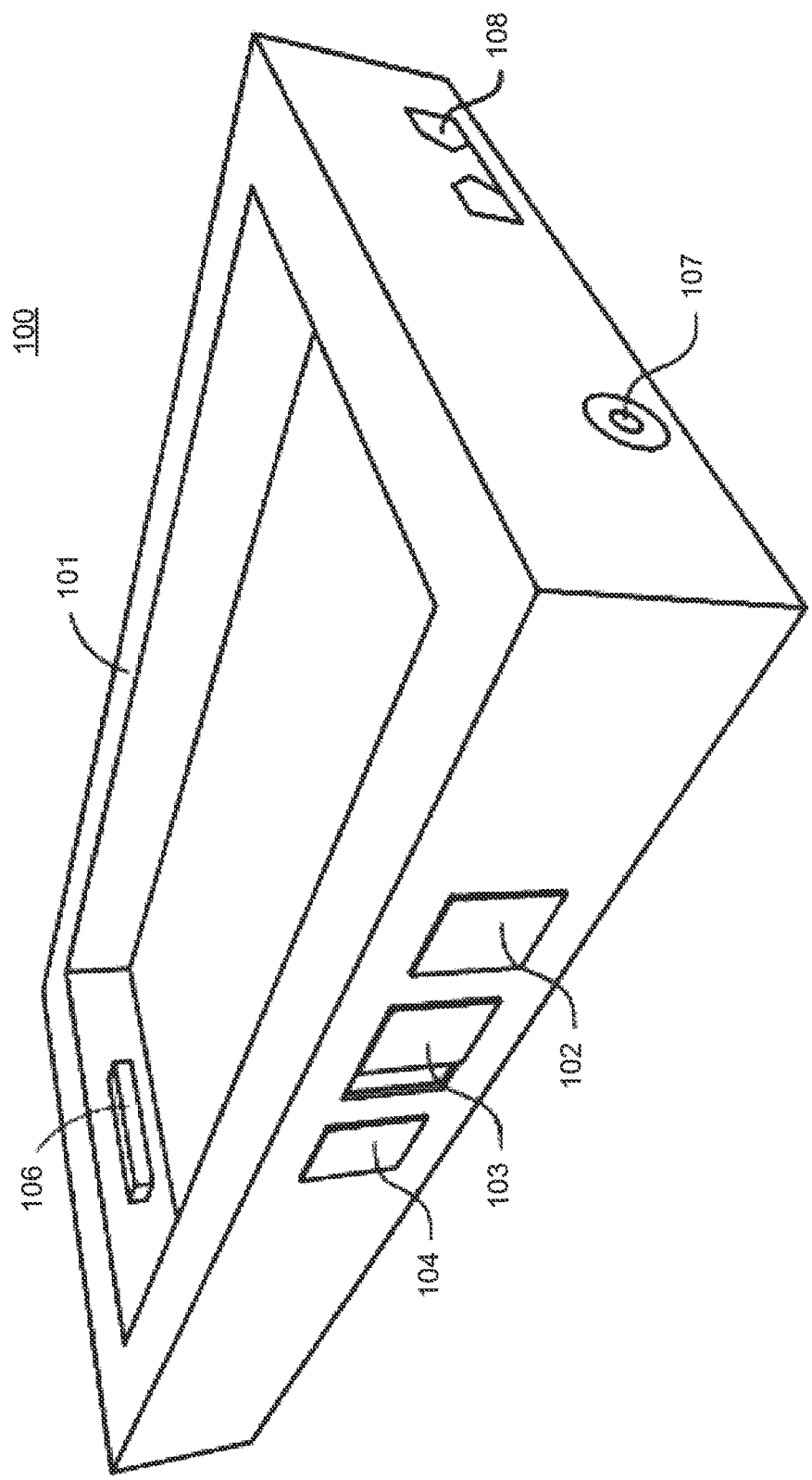

FIGS. 1A and 1B illustrate a device 100 according to one embodiment of the present disclosure. FIG. 1A is a perspective view of the device 100 as seen from the front, bottom, right side. FIG. 1B is a perspective view of the device 100 as seen from the front, top, right side. In one embodiment, the device 100 includes a housing 101 (also referred to as a case), an activation button 102, a safety switch 103, a flashlight power button 104, a power charger interface 105, a mobile device interface 106, a flashlight 107, and electrodes 108.

The housing 101 can be made of plastic, metal, or other type of materials as contemplated by a person having ordinary skill in the art. The shape of the housing 101 can be adapted for a mobile device so that a mobile device can fit and be secured into the housing 101. A mobile device can be a smart phone, a video game console, a tablet, a laptop, or other types of portable electronic devices.

In one embodiment, the housing 101 is designed specifically for a particular mobile device model. Mobile devices fit into their respective designated form fitted housings integrated with electroshock weapon systems.

The device 100 includes a battery (not shown) within the housing 101 that can be charged from a power source through the power charger interface 105. In one embodiment, the device 100 is charged using the same charger designed to charge the mobile device which fits into the device 100. In another embodiment, the device 100 is charged with a standard charger. When the mobile device is secured into the device 100, the mobile device interface 106 is connected to the mobile device. In some other embodiments, the mobile device can also be charged through its power charger interface 105 when the mobile device is secured within the device 100.

The device 100 includes an electroshock self-defense weapon system in the housing 101. In one embodiment, when a user pushes the safety switch 103 to an "on" position, the electroshock self-defense weapon system starts to charge. Once the user presses the activation button 102, the electroshock self-defense weapon system starts to deliver electroshock through the electrodes 108. These electrodes 108 emit an electrical charge that is capable of incapacitating an attacker. In one embodiment as illustrated in FIG. 1B, the electrodes 108 are exposed. In some other embodiments, the electrodes may have a cap, shield, cover, or other protective element placed on top of the electrodes. This protective element may be permanently attached to the case or may be removable.

In addition, in one embodiment, the device 100 can include a flashlight 107 and a flashlight button 104. The user can turn on the flashlight 107 by clicking the flashlight button 104. In one embodiment, the flashlight can be powered by a battery within the housing 101.

Figure 2A:
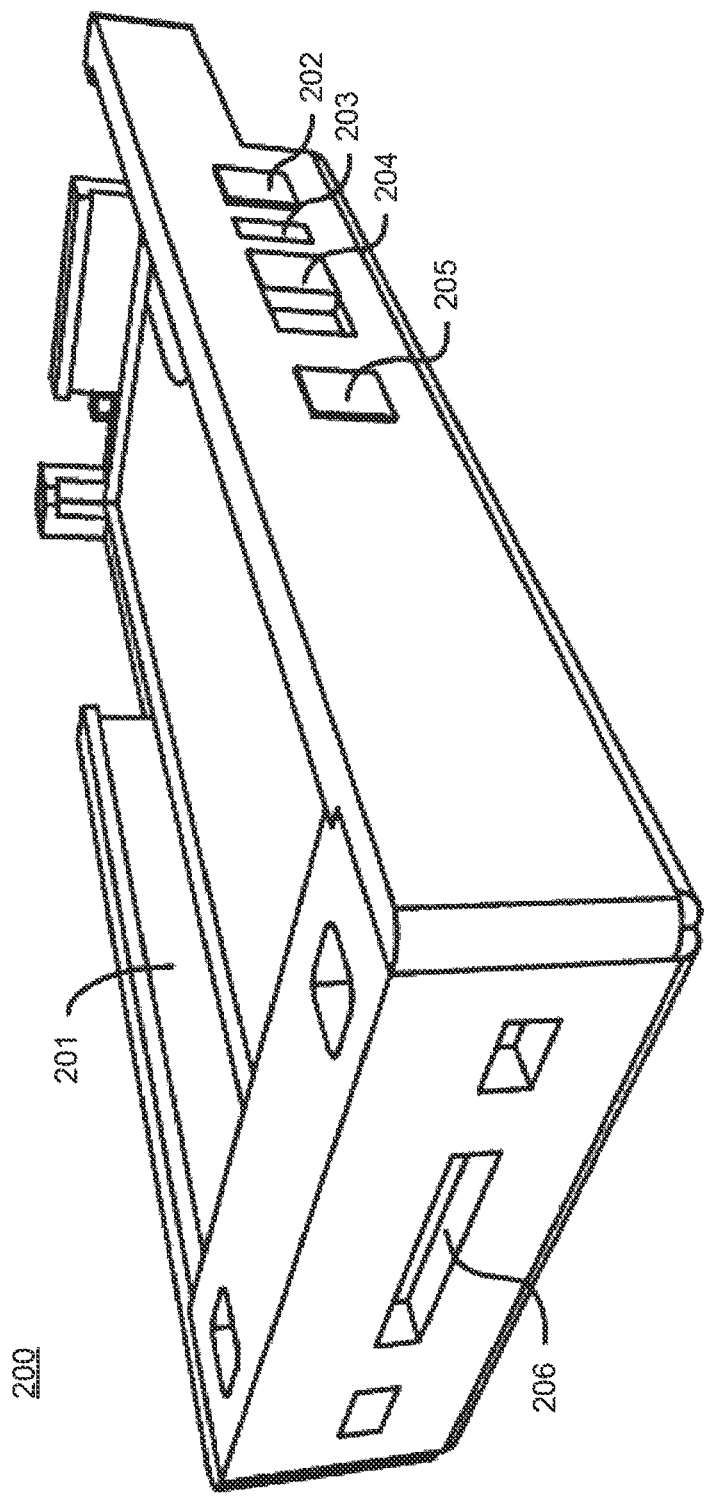
FIGS. 2A, 2B and 2C illustrate a device according to another embodiment of the present invention.
Figure 2B:
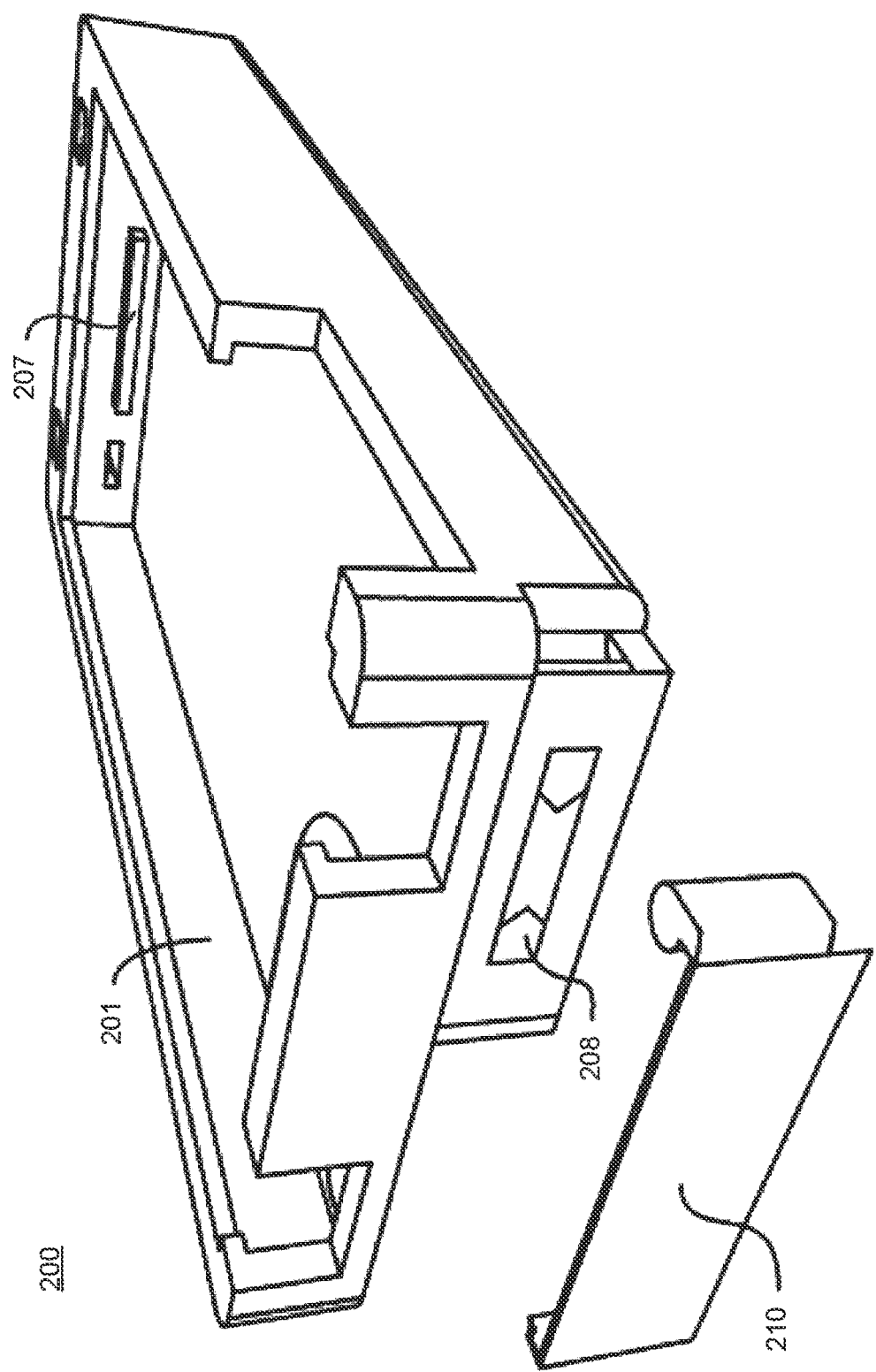
Figure 2C:
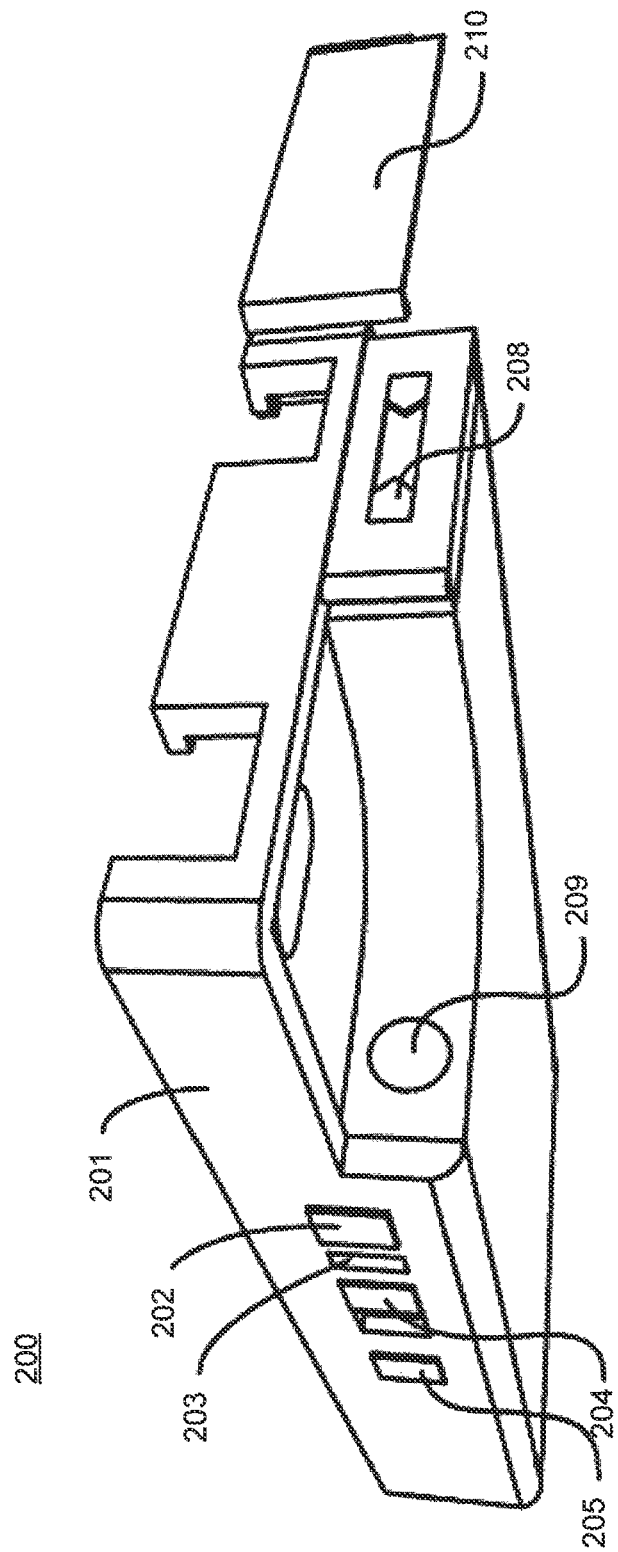

FIG. 2A illustrates a device 200 according to another embodiment of the present disclosure. FIGS. 2B and 2C illustrate additional views of the device 200 which is illustrated in FIG. 2A. FIG. 2B is a perspective view of the device 200 as seen from the front, top, left side. FIG. 2C is a perspective view of the device 200 as seen from the back, top, right side. FIG. 2A is a perspective view of the device 200 as seen from the front, bottom, right side. In one embodiment, the device 200 includes a housing 201 (also referred to as a case), an activation button 202, an LED light 203, a safety switch 204, a flashlight power button 205, a power charger interface 206, a mobile device interface 207, electrodes 208, a flashlight 209, and an electrode cap 210.

The device 200 can work as both a mobile device case and an electroshock self-defense weapon system, integrated in one plastic-type or metal-type housing 201, and the housing can be made with any suitable material, such as plastic or metal. The housing 201 has a shape adapted to secure a mobile device with the housing 201. In one embodiment, a user can activate the electroshock self-defense weapon system by pressing the activation button 202 to release the electroshock via electrodes 208. In some embodiments, the activation button 202 can be held down to release the electroshock. In some other embodiments, the activation button 202 can be clicked to turn on and off the electroshock self-defense weapon system. A device 200 includes a battery (not shown) within the housing 201 to supply electrical power to the self-defense weapon system.

In one embodiment, the electroshock weapon system can be activated by at least one of: (1) moving a safety switch and pressing an activation button, (2) depressing and moving a safety switch and pressing an activation button, (3) depressing a safety button or series of safety buttons and pressing an activation button, or (4) pressing an activation button.

In one embodiment, when a mobile device is attached and connected to the device 200, the mobile device sends a predetermined signal to the electroshock self-defense weapon system to release the electric shock. The predetermined signal can be generated by an application running on the mobile device. In another embodiment, the mobile device receives a remote instruction through a network, such as a cellular network, a Wi-Fi network, or a Bluetooth connection. The mobile device converts the remote instruction to a predetermined signal and sends the predetermined signal to the electroshock self-defense weapon system to release the electric shock.

In one embodiment, the electroshock self-defense weapon system is capable of shooting a projectile which releases the electric shock when the projectile is in direct contact with a target. In some embodiments, the electroshock self-defense weapon system can emit a loud noise when releasing the electric shock. The weapon system can include a device such as a siren to emit noise. In another embodiment, the self-defense system is a non-lethal self-defense system including at least one of pepper spray, oleoresin capsicum, mace, tear gas, dye, pepper foam, stench ointment, personal alarm, or electroshock weapon.

In some embodiments, an electroshock module is integrated inside of a mobile device, instead of a housing of the mobile device. In another embodiment, a self-defense module includes a clip. The clip is designed to be attached to a case of a mobile device. Thus, the self-defense module can use the clip to attach to the case which in turn attaches to the mobile device. In one embodiment, the self-defense module is permanently fixed to the case. In another embodiment, the self-defense module is detachable from the case.

In one embodiment, the device 200 includes an LED light 203 to indicate that the safety switch 204 has been triggered and the device 200 is ready for activation. An additional LED light can also be included to display when the device is charging, has been charged or as a signal to recharge the device. In one embodiment, the safety switch can be an on/off switch. This switch can be moved linearly and prevents the device from incidentally discharging without a user's intent. In another embodiment, this switch can be replaced with a button. In some other embodiments, the safety mechanism can be in the form of a switch or multiple switches, a button or multiple buttons, a removable pin, a plastic cover, or another feature designed to prevent the electrodes from accidentally discharging.

In FIGS. 2B and 2C, the electrodes 208 are shown with an electrode cap 210 that can be placed on top of the electrodes 208. The electrode cap 210 serves as an additional form of safety and helps to further prevent incidental shock and discharge. The electrode cap 210 can be made of plastic, metal or other type of material and can be removable. In one embodiment, the electrode cap is attachable to the device 200.

In one embodiment, in order to use the device 200 for the intended use of personal defense, a user removes electrode cap 210 and slide safety switch 204 linearly from an 'off' position to an 'on' position. The LED light 203 turns on, indicating the self-defense weapon system is charged and is ready for use. After the activation button 202 is pressed, the self-defense weapon system delivers the electroshock via the electrodes 208. The electroshock is capable of incapacitating or shocking an attacking human or animal. After use, the device 200 can be turned off by sliding the safety switch 204 from the on position to the off position, and the electrode cap 210 can then be replaced to cover the electrodes 208.

In one embodiment, the device 200 provides a form fitted case which is integrated with an electroshock weapon system. The device 200 provides an electroshock weapon system that is placed on one side of a form fitted smartphone case. In another embodiment, the electroshock weapon system and the mobile device case are permanently integrated together. In yet another embodiment, the electroshock weapon system may be attached to and removable from the smartphone case by way of a clip, snap, screw, Velcro or other form of temporary attachment. In still another embodiment, a mobile device can slide into the case of the device 200 to permanently or temporarily attach to the case of the device 200.

The practicality and quick deployment potential of the device 200 makes it an advantageous tool for self-defense. A robber or attacker would not expect a mobile device case to deliver such an incapacitating shock. The device 200 effectively protects the user due to the ease of access and rapidity with which the device can be activated. In another embodiment, the device 200 is designed to deliver an electrical shock, surge, pulse, current or other type of self-defense action for the purpose of self-defense or personal protection.

Figure 3A:
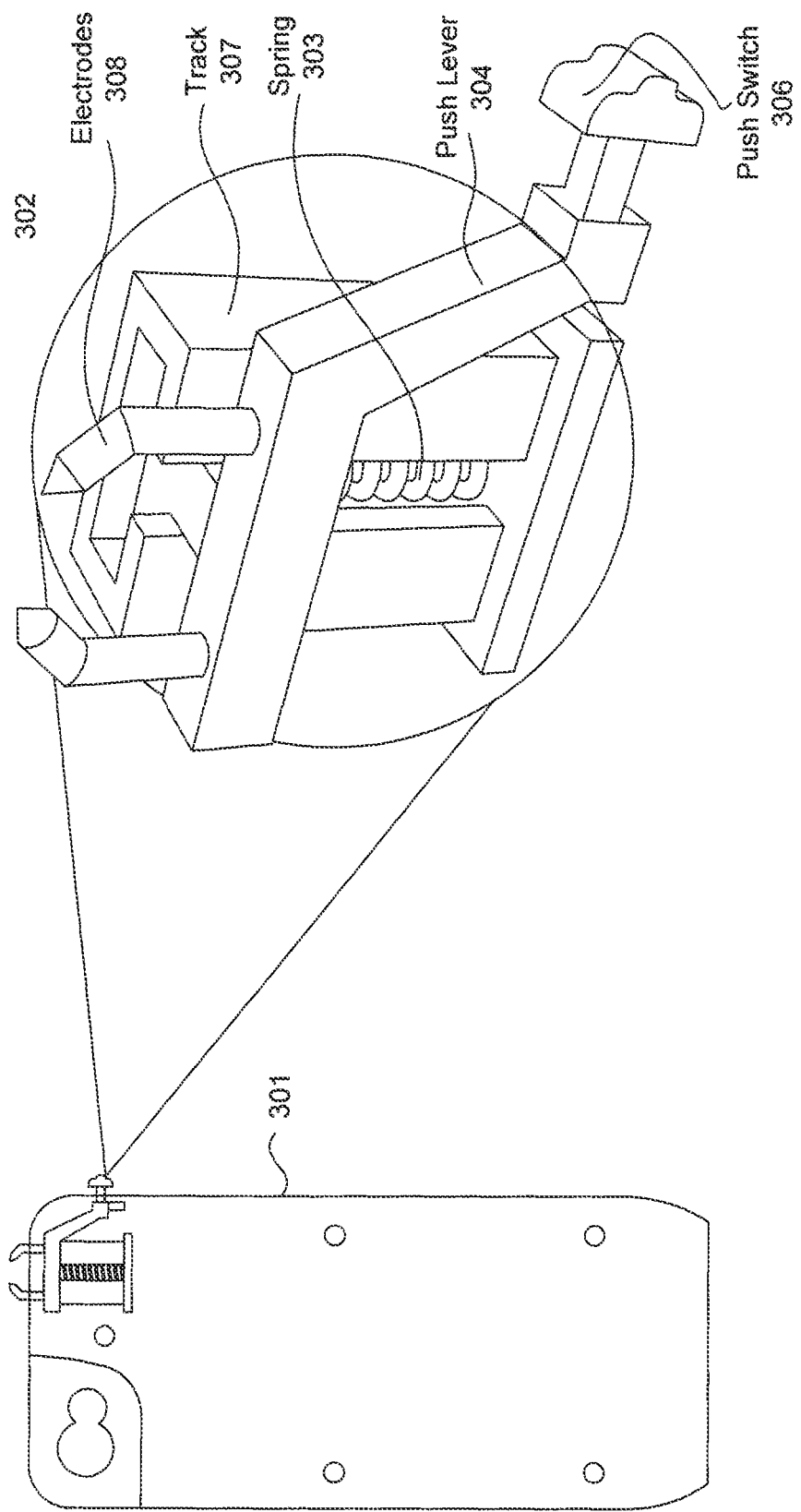

FIG. 3A illustrates a sample electrode-ejecting mechanism, according to one embodiment of the present disclosure. As shown in FIG. 3A, an electroshock module includes electrodes 308 and a spring mechanism 302. The electrodes 308 are disposed within the housing 301 and are configured to release the electric shock. The spring mechanism 302 is capable of ejecting a portion of the electrodes 308 from the housing 301.

Figure 3D:
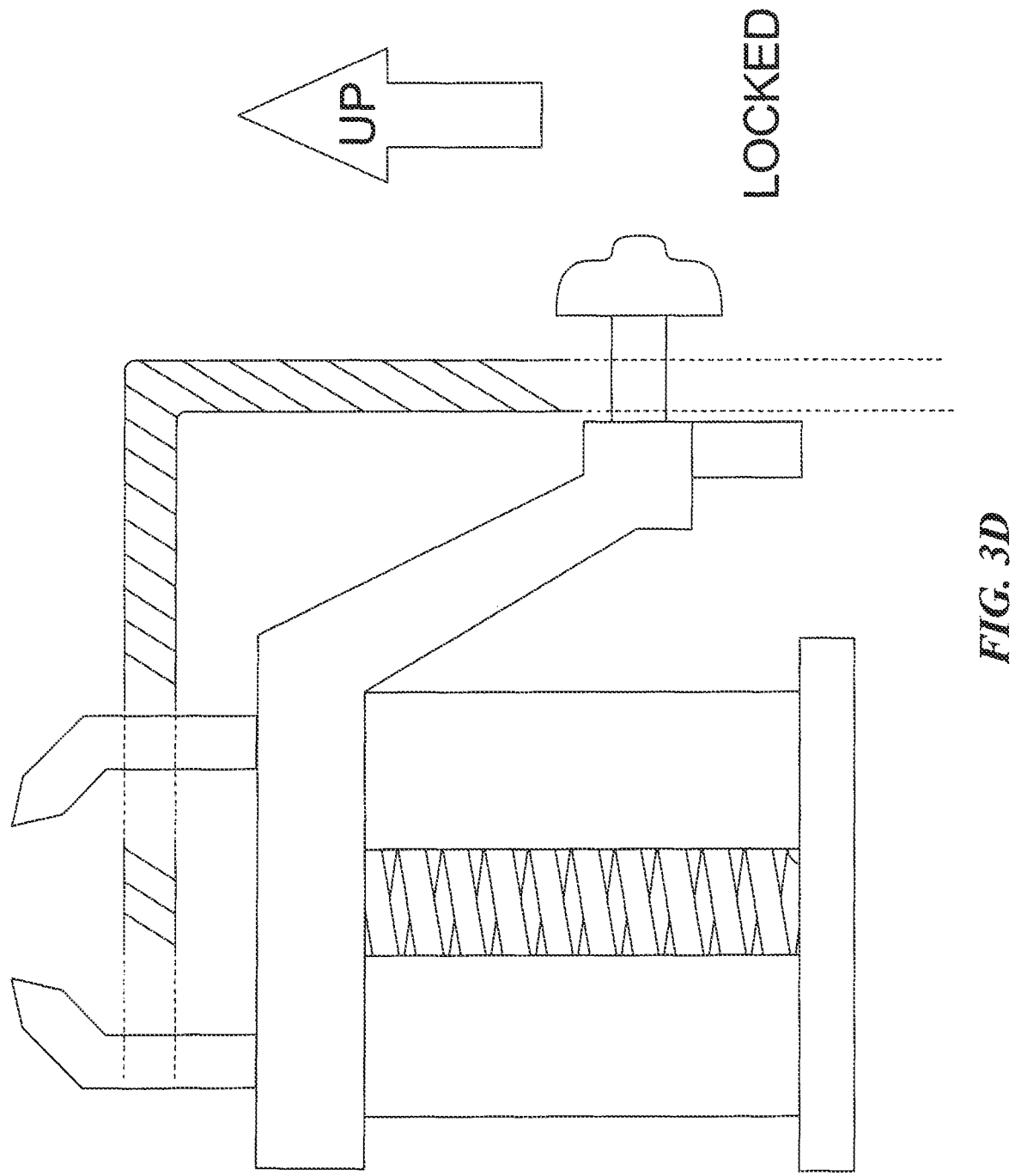

In one embodiment, the spring mechanism 302 includes a spring 303, a push lever 304, a locker 305, and a push switch 306. The push lever 304 is mechanically coupled to the electrodes and one end of the spring 303. The locker 305 locks the push lever 304 in a first position so that the spring 303 is compressed and the electrodes 308 are positioned within the housing 301, as shown in FIG. 3B. When the push switch 306 is pushed, the push lever 304 releases from the locker and slides up along a track 307, as shown in FIG. 3C. The push switch 306 is pushed to a second position by a decompression force of the spring 303, wherein the tips of the electrodes 308 protrude from the housing 301 when the push lever 304 is in the second position, as shown in FIG. 3D.

Figure 3E:
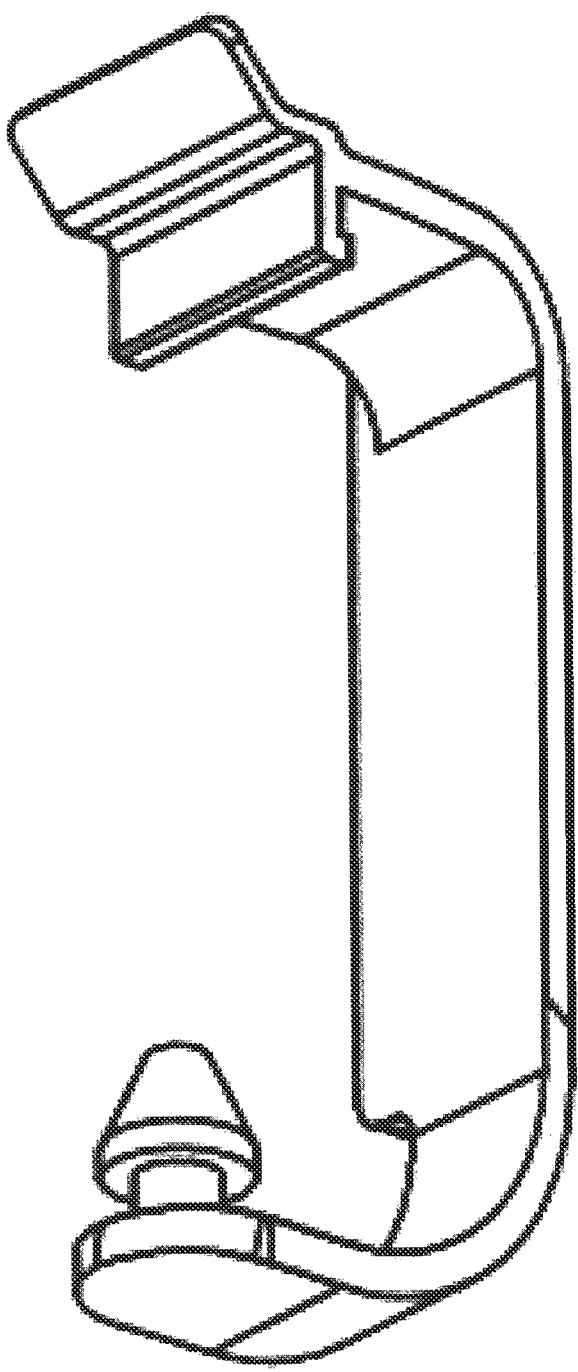
FIG. 3E shows a sample protective cap configured to cover electrodes of an electroshock module.

In another embodiment, the spring mechanism includes a spring and a protective cap. FIG. 3E shows a sample protective cap configured to cover the electrodes of the electroshock module. When the protective cap is in a closed position, the spring is compressed and the electrodes are positioned within the housing. When the protective cap is in an opened position, the tips of the electrodes protrude from the housing by a decompression force of the spring.

Figure 4:
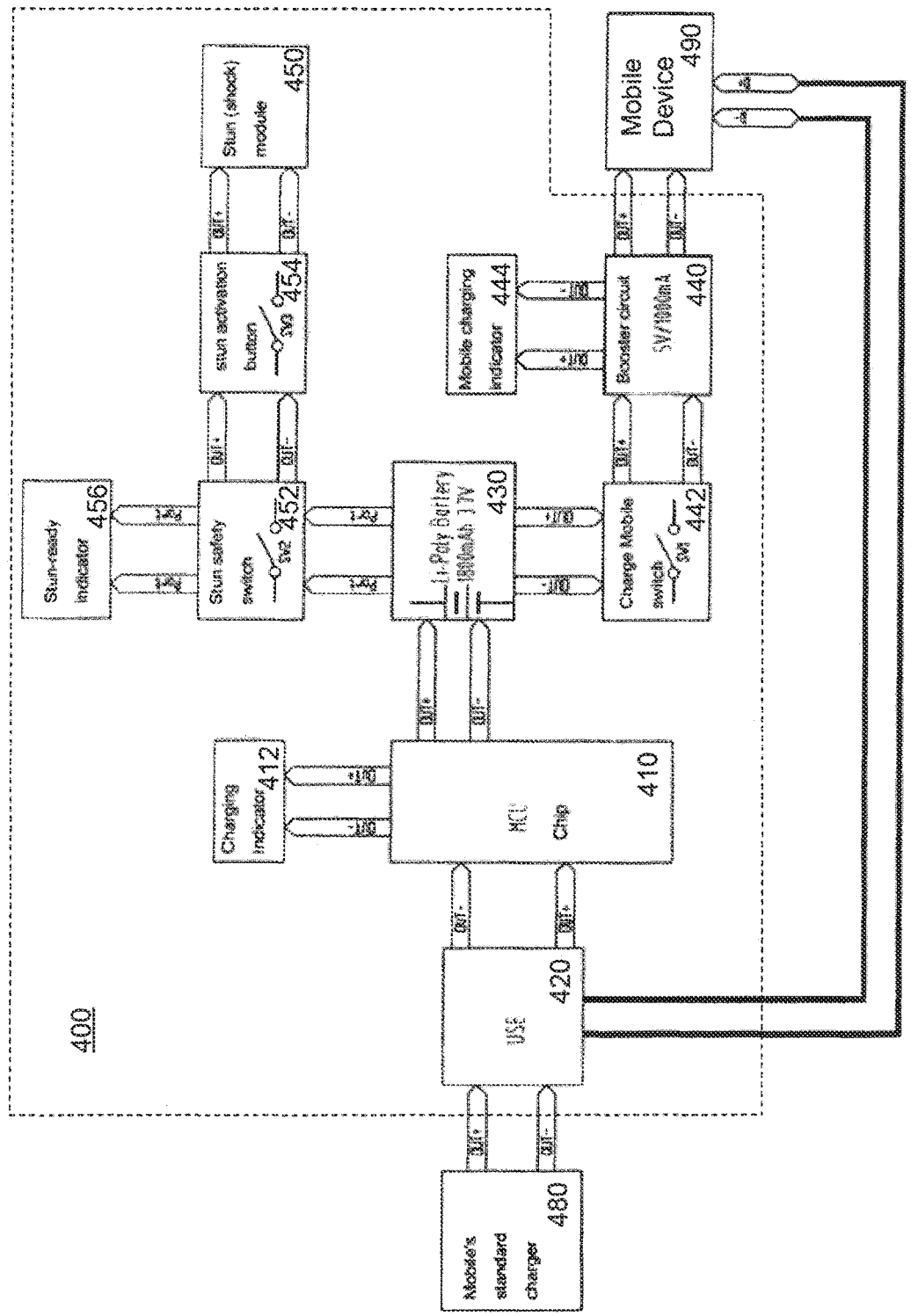
FIG. 4 illustrates a high level block diagram of electronic schematics of a self-defense device.

FIG. 4 illustrates a high level block diagram of the electronic schematics of a self-defense device 400. The self-defense device 400 can be attached to a mobile device 490. The device 400 includes a microcontroller unit (MCU) chip 410. The MCU chip 410 can have at least one built-in analog-to-digital (ND) converter to detect charging current supplied from an external charger 480 via a charging interface 420 at any time. In one embodiment, the charging interface is a USB interface 420. The MCU chip 410 uses Pulse-width modulation (PWM) techniques to adjust the charging current to a constant current suitable for a built-in battery 430 and output the adjusted charging current to the battery 430. In one embodiment, the battery 430 is a Lithium Polymer battery rated at 3.7 V and 1800 mAh; and accordingly the charging current is about 1200 mA at a voltage of 4.5 V. However, a person of skill in the art would understand that the specifications of the battery and the provided charging current can be different.

The MCU chip 410 can further control a charging indicator 412 and a full charge indicator 414 (not shown in FIG. 4). For example, the MCU chip 410 can turn on an LED light as the charging indicator 412 when the MCU chip 410 is supplying charging current to the battery 430. Once the battery 430 is fully charged, the MCU chip 410 turns off the charging indicator 412 and turns on another LED light as the full charge indicator 414. In one embodiment, the MCU chip 410 prevents the battery 430 from supplying the electrical power to a mobile device 490 when a power level of the battery 430 is below a predetermined level.

The USB interface 420 can further include a data interface. Any data received on the data interface of the USB interface 420 will be relayed directly to the mobile device 490. When the mobile device 490 is attached to the self-defense device 400, a device interface of the self-defense device 400 detachably couples to an interface of the mobile device. The battery 430 is capable of supplying electrical power to the mobile device 490 via the device interface. The mobile device 490 can establish data communication with external devices through the USB interface 420 of the self-defense device 400.

In one embodiment, the battery 430 can connect to a booster circuit 440 via a charge mobile switch 442 between the battery 430 and the booster circuit 440. When the charge mobile switch 442 is off, the battery 430 does not supply electric current to the booster circuit 440. When the charge mobile switch 442 is on, the battery 430 supplies an electric current to the booster circuit 440. In one embodiment, electric current is supplied by the lithium polymer battery 430 at a voltage from 3.6 to 4.3 V. The booster circuit converts the electric current at 3.6 to 4.3 V to an output electric current of about 1000 mA at about 5 V which is suitable for the mobile device 490. The booster circuit is electrically connected to the mobile device 490 when the mobile device is attached to the self-defense device 400. The booster circuit draws the electrical power from the battery 430, converts it to an electrical current suitable for the mobile device 490, and supplies the converted electrical current to the mobile device 490. In one embodiment, the device 400 can further include a mobile charging indicator 444. When the booster circuit 440 supplies the electric current to the mobile device 490, the booster circuit 440 turns on the mobile charging indicator 444 to indicate that the self-defense device 400 is charging the mobile device 490.

The self-defense device 400 further includes a shock module 450 (also referred to as a stun module or self-defense module, as these terms may be used interchangeably within this description). In one embodiment, there are a stun safety switch 452 and a stun activation button 454 between the stun module 450 and the battery 430. The stun safety switch 452 is connected to a stun-ready indicator 456. When the stun safety switch is on, the battery 430 starts to charge a capacitor (not shown in FIG. 4). The capacitor builds up a charge from the electric current supplied by the battery 430. After the capacitor is charged, the stun-ready indicator turns on to indicate the stun module is ready to operate. If the stun activation button 454 is pressed, the shock module 450 will release electric pulses.

Figure 5:
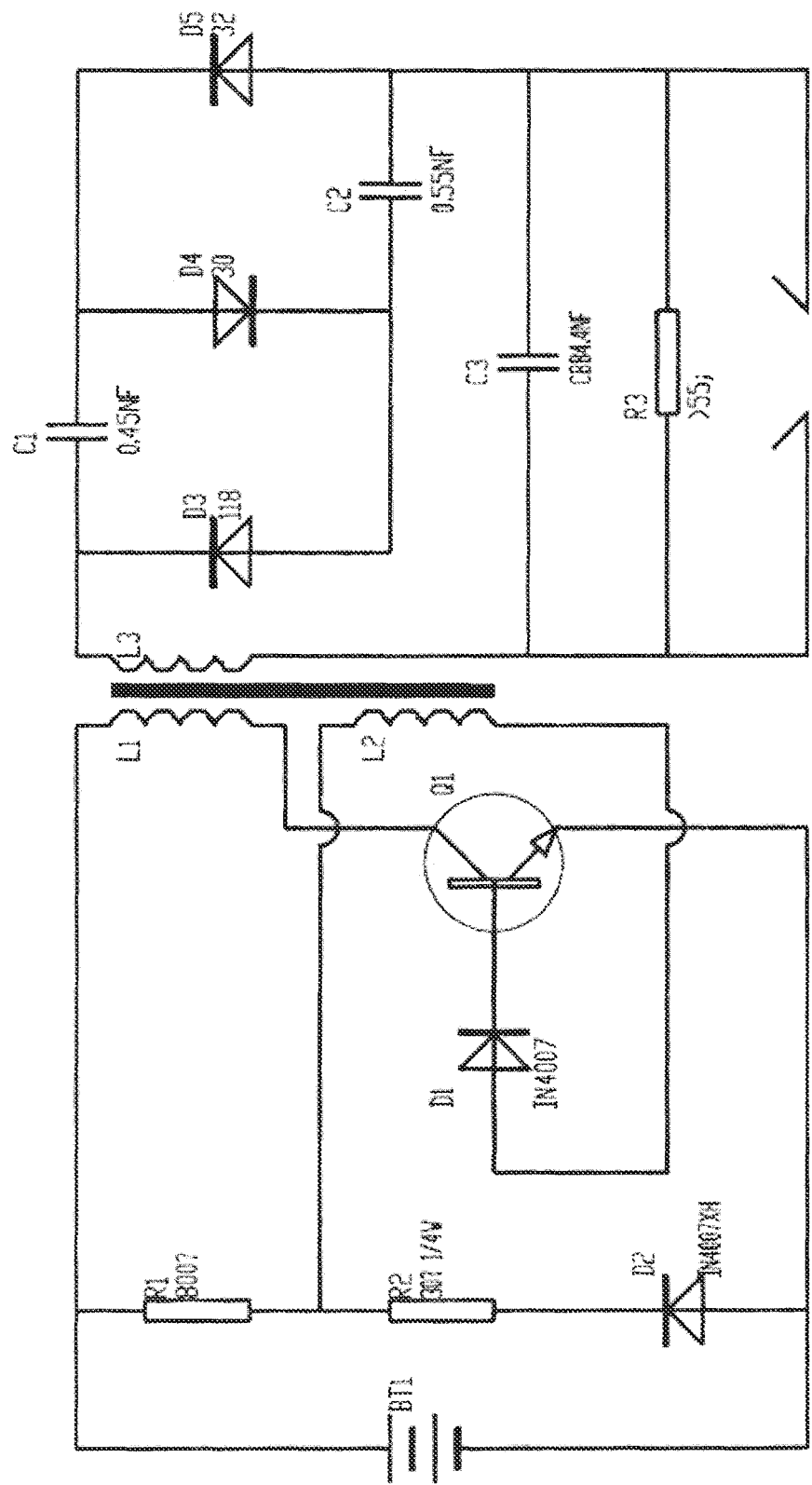
FIG. 5 is a sample circuit diagram for an electric shock portion of a self-defense device.

FIG. 5 is a sample circuit diagram for the electric shock portion of the self-defense device 400 (also referred to as the shock module). In one embodiment, the shock module includes two portions as shown in FIG. 5. The first portion is an autonomous booster circuit shown on the left side of FIG. 5. Primary transformer L1 provides a voltage equivalent to the voltage of the battery BT1. Transformer L2 and switch Q1 constitutes a self-oscillation feedback circuit. Accordingly a high volt pulse voltage is generated at the secondary transformer L3. The second portion is a triple voltage rectification circuit including diodes D3, D4, D5 and capacitors C1, C2, C3, as shown on the right side of FIG. 5. Through the triple rectification circuit, the high volt pulse voltage from L3 is increased three times at capacitor C3. Once the voltage at capacitor C3 is high enough (i.e. charged), the capacitor C3 is capable of breaking down air between two electrodes and delivering the electric shock. Resistance R3 is the internal discharge resistance. While FIG. 5 depicts an example circuit that can be used for the shock module, as will be appreciated by a person of skill in the art, modifications to the circuit are possible. For example, the rectification circuit can increase the high volt pulse voltage from L3 more or less than three times.

Figure 6:
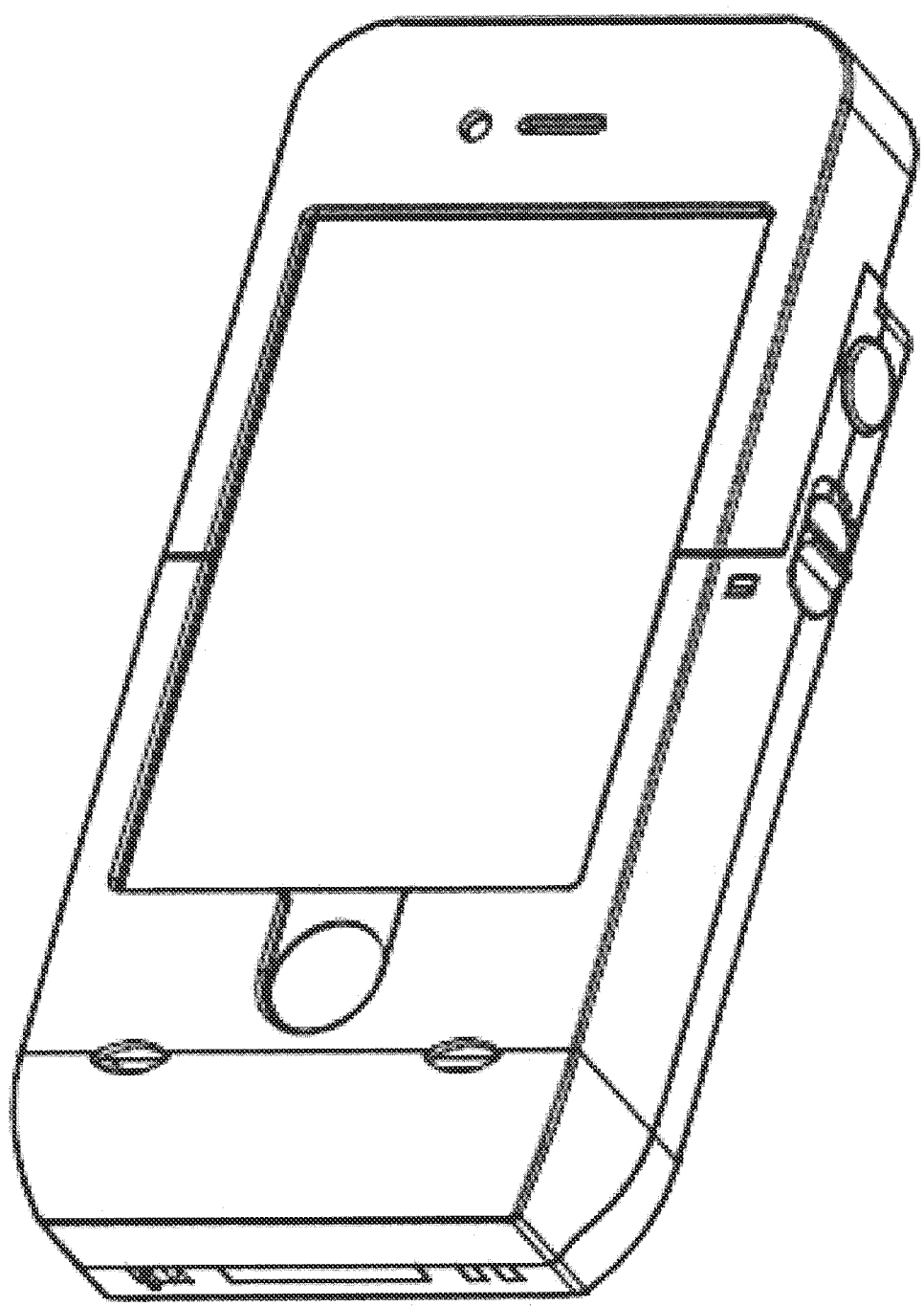
FIG. 6 illustrates a sample device including electric shock functionality.

FIG. 6 illustrates a sample device including the electric shock functionality. In one embodiment, the device illustrated in FIG. 6 can include a mobile device and a housing module attached to the mobile device. The housing module includes a shock module and a built-in battery as disclosed in previous paragraphs. In some embodiments, the housing module can have two portions. These two portions are designed to be slipped onto the mobile device and attached together on the mobile device by a clip.

Figure 7A:
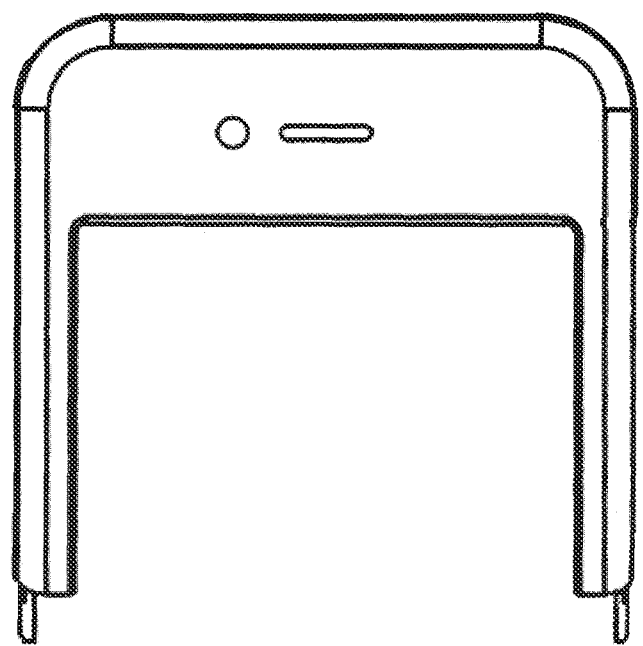
FIGS. 7A, 7B and 7C illustrate a sample housing module having a shock module and a built-in battery that include two portions.
Figure 7A:
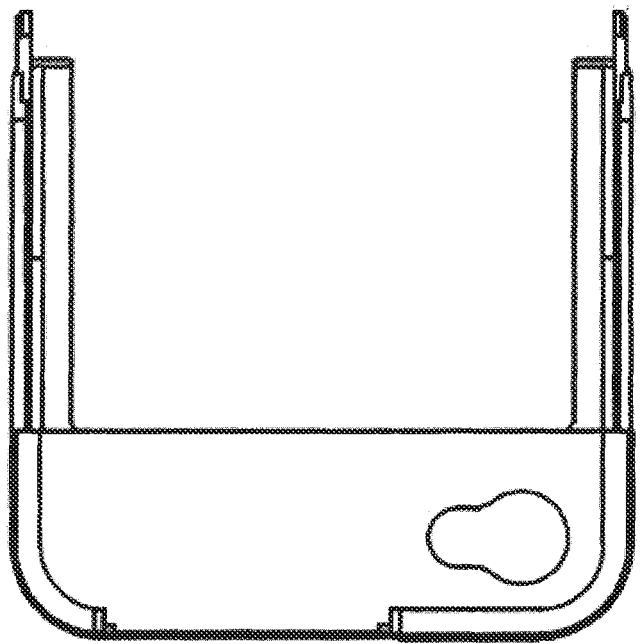
Figure 7B:
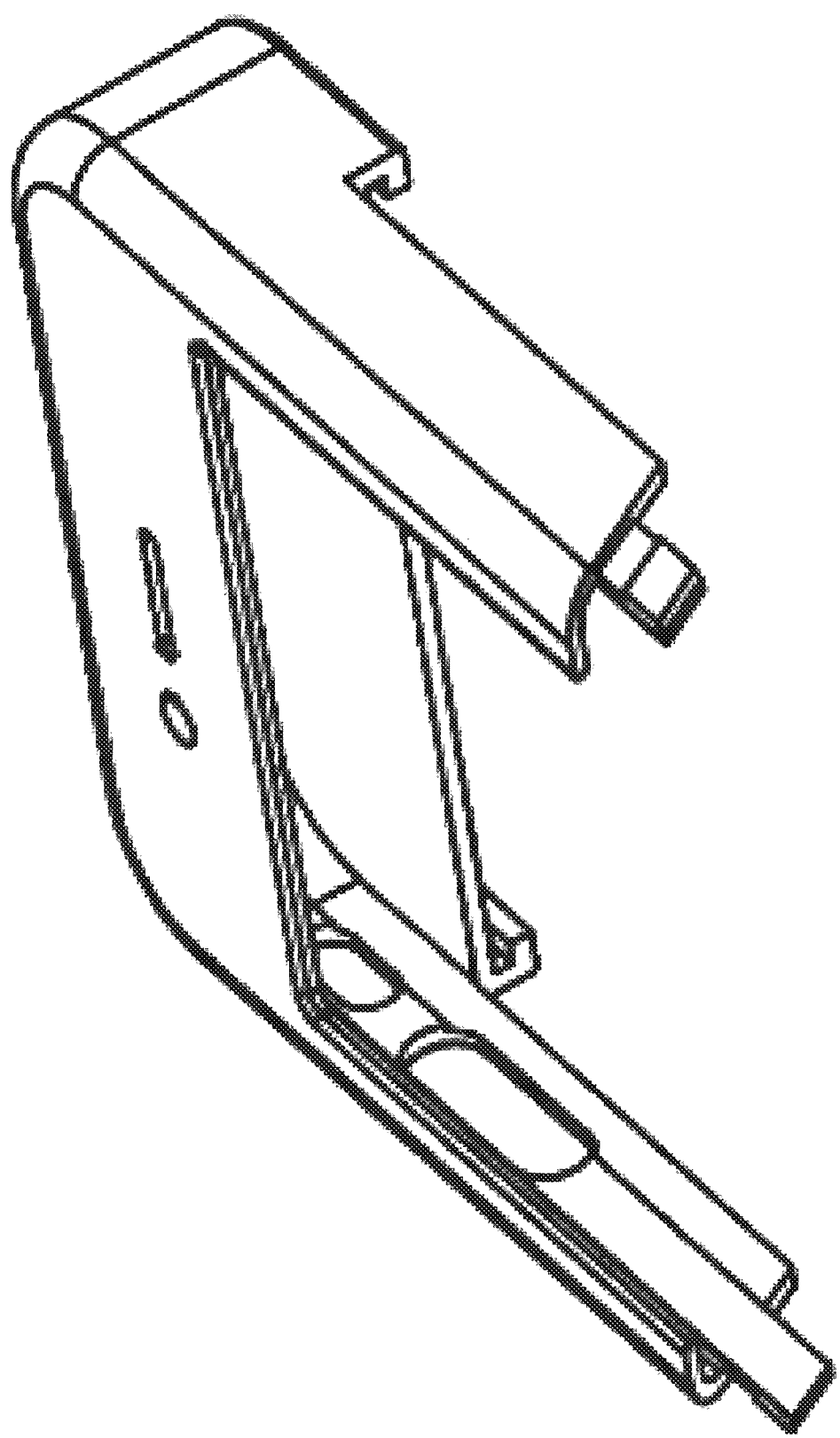
Figure 7C:
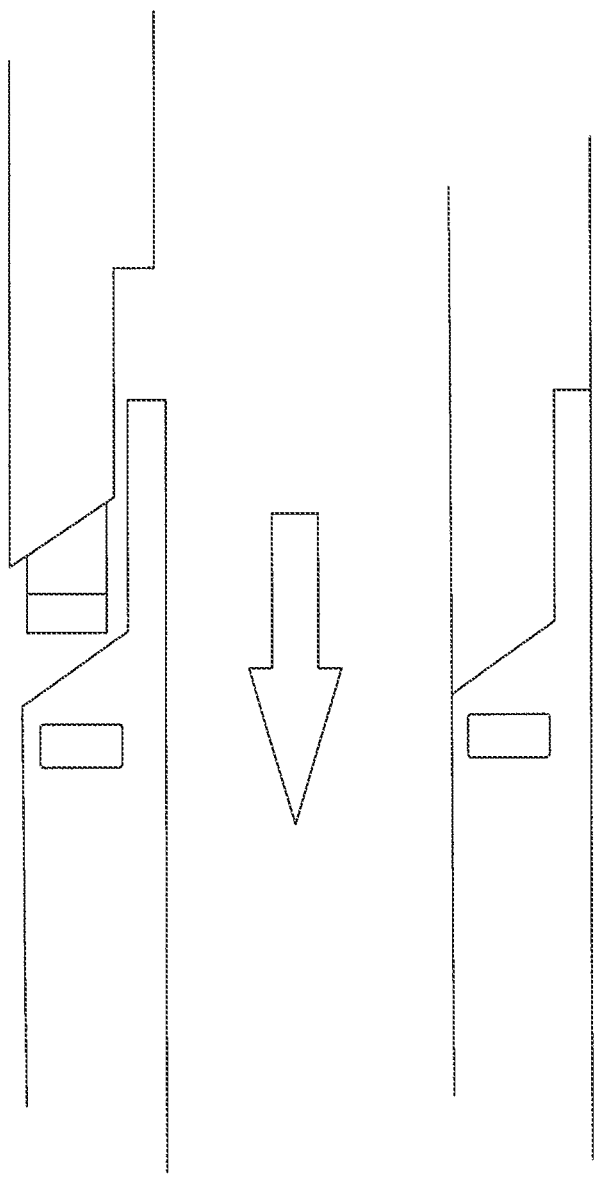

For example, FIG. 7A illustrates a sample housing module having a shock module and a built-in battery. FIG. 7B illustrates an additional perspective view of the upper portion of the housing. The sample housing module has two portions. And these two portions can be attached together by a mechanical interface. In one embodiment, the mechanical interface is one or more U-shaped clips that secure the two portions together by clipping one portion to another. As shown in FIG. 7C, the clips of the upper portion of the housing can slide into the lower portion of the housing. The clips snap into the lower portion and the two portions are mechanically secured together. In one embodiment, the shock module and the battery can both be included in one portion of the housing module. In another embodiment, the shock module is included in one portion of the housing module, and the battery is included in another portion of the housing module. In one embodiment, a self-defense module, such as the electroshock module, can be removably attached to a case that can be secured to a mobile device. For example, the self-defense module can be clipped to the case, screwed onto the case, or attached to the case magnetically. The electroshock module can include its own battery and electrodes. In addition to attaching to the case, the electroshock module can also electrically couple to the mobile device through a port of the mobile device so that the battery can charge the mobile device.

The removable electroshock module can also be interchangeable with other types of self-defense modules, such as pepper spray, oleoresin capsicum, mace, tear gas, dye, pepper foam, stench ointment, and/or a personal alarm. The other types of self-defense modules can be removably attached to the case in the same or a different manner from which the electroshock module attaches to the case. Further, more than one self-defense module can be attached to the case simultaneously.

An additional embodiment of the present invention is shown in FIGS. 8A-11B. In this embodiment, the invention includes two physically separate parts: a protective case 500 and a self-defense module 530. These two parts are mated to each other so that the protective case 500 may be securely attached to the self-defense module 530. When so attached, the two parts operate as one, unitary structure that provides the functionality described in the preceding paragraphs. This embodiment also allows for easy and rapid removal of the protective case 500 from the self-defense module 530. When disconnected, the protective case 500 functions like other cases used with handheld electronic devices. But when the protective case 500 is secured to the self-defense module 530, the full range of self-defense capabilities described above become available.

This embodiment offers the advantage of allowing a user to remove the self-defense module 530 when that module is either not desired and not allowed. For example, a user may wish to use just a protective case with her handheld electronic device for convenience or other reasons. A user may not be allowed to carry a self-defense device in some settings, such as when on an airplane or inside certain public buildings. In these situations, many users will still want to use a protective case with their handheld electronic device, and this embodiment of the invention offers that option to users, while also allowing users the ability to quickly and securely connect the protective case 500 to the self-defense module 530 to create a fully-operational self-defense device.

Figure 8A:
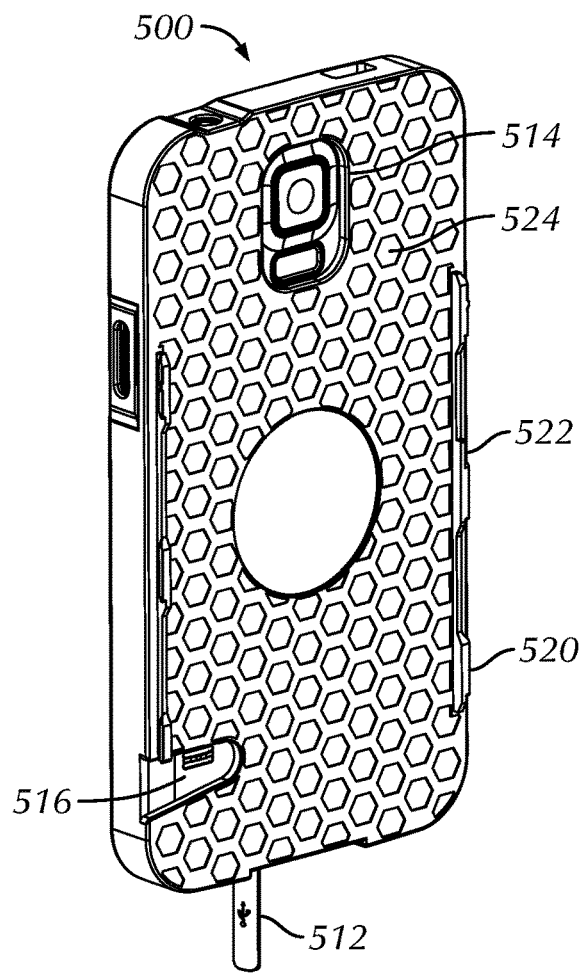
FIGS. 8A and 8B show perspective views of a preferred embodiment of a protective case installed on a handheld electronic device.
Figure 8B:
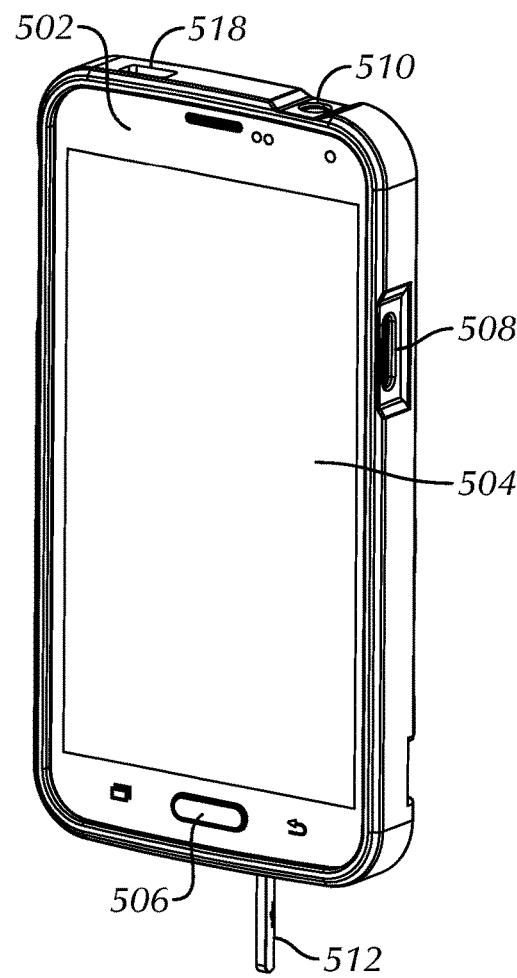

FIGS. 8A and 8B show the protective case 500 of this embodiment of the invention with a handheld electronic device 502. The electronic device in these and other figures is a cellular phone with a large screen 504, which is most likely a touch screen. This configuration is quite common today, and to ensure a user retains full use of the electronic device, the protective case 500 must not cover the screen or key buttons 506 of the device. The presentation of a touch screen cellular phone in the figures is illustrative only, as the present invention may be used with any type of handheld electronic device. Examples of other such devices includes GPS devices, music players, gaming devices, and essentially any other handheld electronic device with a screen and/or a keypad.

In FIGS. 8A and 8B, several typical features of the protective case 500 and the handheld electronic device 502 are shown. A power/reset button 508, an audio out port 510, and a charger/communications port cover 512 are all shown as part of the handheld electronic device 502. These features are accommodated in the design of the protective case 500 to ensure the full functionality of the handheld electronic device 502 is preserved. The protective case 500 is shown with a rear camera cutout 514 and a rear speaker cutout 516, which are additional customizations provided for a particular handheld electronic device 502. The particular features of this kind and their locations and sizes will vary from one handheld electronic device to the next. The protective case 500 in these figures is also shown with a strap slot 518 to allow for use of a carry strap, such as a wrist strap. The back of the case 500 is shown with a grip surface texture 524 to enhance a user's grip on the case 500.

FIG. 8A also shows one version of the positive retention means 520 of the protective case 500. In the particular embodiment shown in FIG. 8A, rails with tabs are shown as the positive retention means 520. A case locking mechanism 522 is also shown. The operation of this structure will be described in connection with FIGS. 11A-11C below, but it should be noted at this point that any type of structure providing for positive engagement between the protective case 500 and the self-defense module 530 may be used. Spring-loaded tabs may be used of the general type found on snow-ski bindings or clipless bicycle pedals and cleats. Whatever particular form the retention and engagement structures take, they must provide a secure connection that can be quickly and easily completed and undone by a user.

Figure 9:
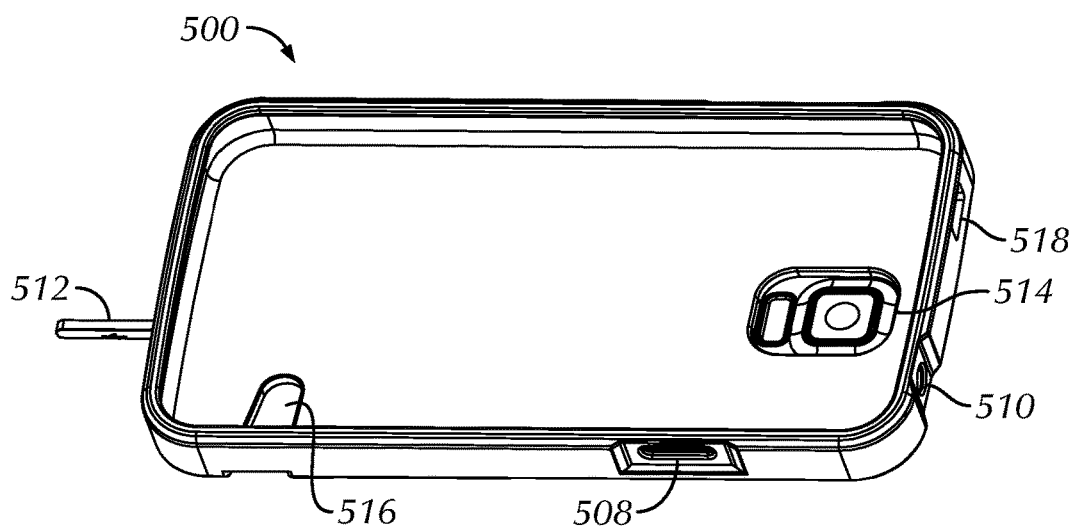
FIG. 9 is a perspective view of a protective case alone.

FIG. 9 shows the protective case 500 with no handheld electronic device 502. This drawing provides another illustration of the parts described above. The power/reset button 508 is actually a cutout in the protective case 500, which allows a user to activate the handheld electronic device's power or reset button. Similarly, the audio out port 510 shown in FIG. 9 is another cutout in the case 500, which is positioned directly over a handheld electronic device's audio jack when the case 500 is installed. The rear camera cutout 514 and rear speaker cutout 516 can be seen in FIG. 9, too.

The sides of the case 500 shown in FIG. 9 may be somewhat rigid, quite flexible or some degree of flexibility between these extremes. A more rigid case 500 may provide advantages, such as a more stable platform for the positive engagement means 520. More flexible material will make it easier to install the case 500 on a handheld electronic device 502. The side walls of the case 500 are relatively thin in the embodiment shown in FIG. 9, because the smartphone this particular case is designed to accommodate is a relatively thin device. The case 500 will vary in its dimensions from one product to the next, because the case 500 is sized to fit specific products. Most smartphones are relatively thin, so the case 500 used with such handheld electronic devices will have thin side walls.

FIG. 10A shows the self-defense module 530, which has engagement means 532 and a locking mechanism 534 to secure the module 530 to a protective case 500. A charger/communications plug 536 is shown near the bottom of the module 530. This plug will vary with the handheld electronic device. For most smartphones, the plug will be located in the position shown in FIG. 10A. But some handheld electronic devices have charger/comm ports on the sides or top of the device. The plug 536, therefore, will be positioned to mate with the charger/comm port of the handheld electronic device. The self-defense module 530 also has an activation button 538, which is used to activate the stun gun found in the embodiment of the module 530 shown in FIG. 10A.

FIG. 10B shows the self-defense module 530 and a protective case 500 secured together as a single unit. A handheld electronic device 502 is installed in the protective case 500, which is secured to the self-defense module 530. The screen 504, home button 506, power/reset button 508, and audio out port 510 are all shown in this drawing, and all are accessible and operable when the handheld electronic device 502 is installed in the case 500, which is secured to the self-defense module 530. The embodiment of the self-defense module 530 shown in this drawing has a stun gun as the defensive weapon, and a stun gun activation button 538 is shown on one side of the self-defense module 530.

Figure 10C:
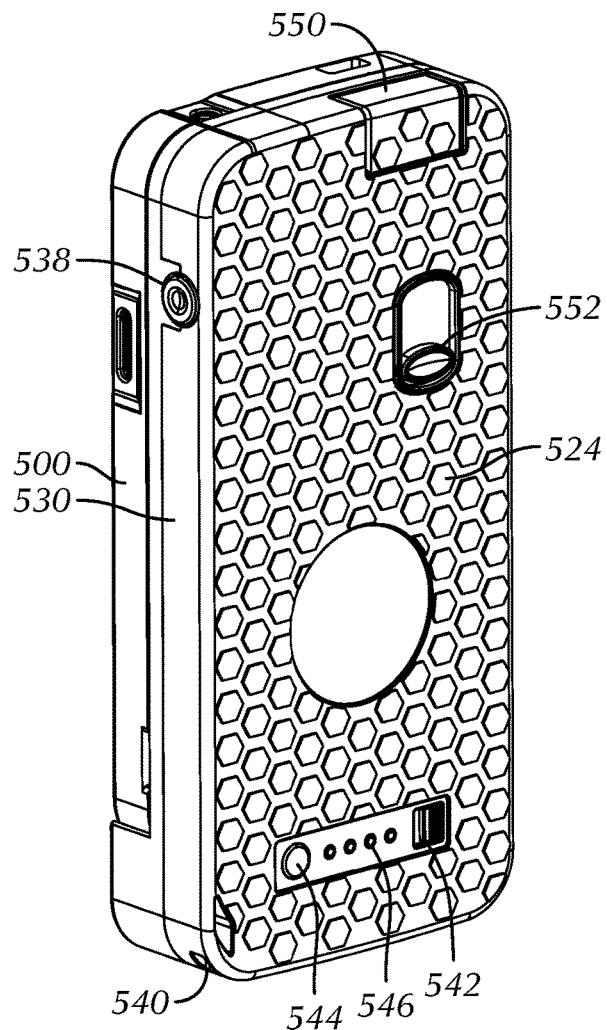
Figure 10D:
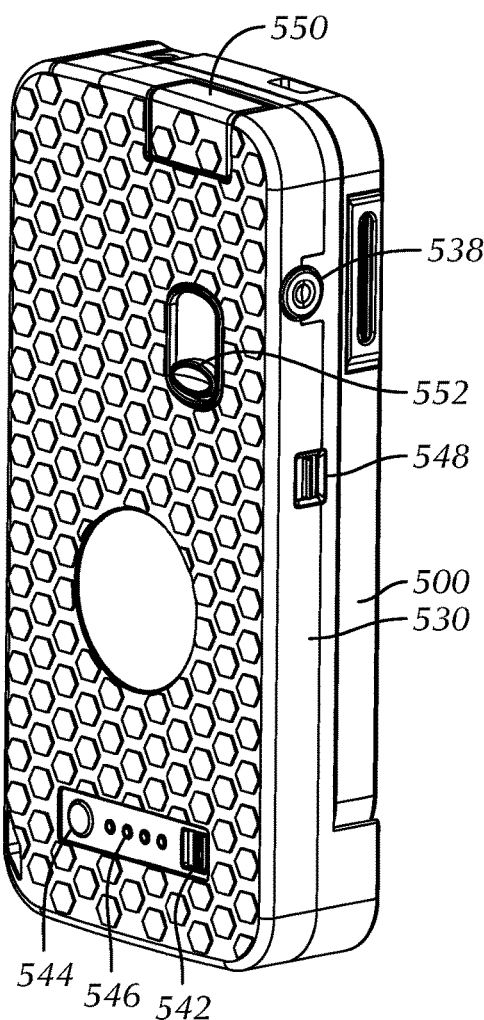

FIGS. 10C and 10D show the self-defense module 530 and protective case 500 secured together from alternate back perspective views. The stun gun activation button 538 can be seen on both sides of the self-defense module 530 in this embodiment. This design requires a user to depress both activation buttons 538 simultaneously in order to activate the stun gun. This is a protective feature, as it should prevent users from inadvertently arming the stun gun. A retractable stun gun probe cover 550 and a probe extension slider 552 are also shown in these drawings. These items will be described in more detail below.

FIGS. 10C and 10D show a grip surface texture 524 on the back of the self-defense module 530, which is the same or a similar material to that used on the back of the protective case 500. A wrist strap slot 540 is shown on a lower corner of the self-defense module 530. A charger switch 542 may be used to activate the self-defense module 530 as a charger for the handheld electronic device 500. For example, when used with a smartphone, the self-defense module 530 may contain a sufficiently large battery (or batteries) to allow the self-defense module 530 to be used as a back-up power source to recharge the smartphone. These features of the invention are described in some detail above. The charger switch 542 may be used to activate this feature of the product. That is, pressing or sliding the charger switch 542 may allow the self-defense module 530 to charge or supply power to the handheld electronic device 502.

Similarly, a charge level button 544 and charge level indicators 546 may be used to determine the state of charge of the handheld electronic device 500, the self-defense module 530, or both. Pressing the charge level button 544, with cause the charge indicators 546 to illuminate to show the state of the charge of the selected device. This feature can be particularly useful for determining the level of charge of the self-defense module 530. Most handheld electronic devices 502 have battery charge indicators, so there is less need to use the charge indication system of the self-defense module 530 to determine the charge of the handheld electronic device 502. For the stun gun embodiment shown in these drawings, it is important to ensure there is sufficient battery capacity remaining in the self-defense module to properly use the self-defense weapon. A switch or selector may be used to connect the charge indicators 546 to either the self-defense module 530 or to the handheld electronic device 502. This capability could be included in the charger switch 542 or a different switch or button could be added for this purpose. Such minor design variations are well within the knowledge of those with skill in the art.

Figure 11A:
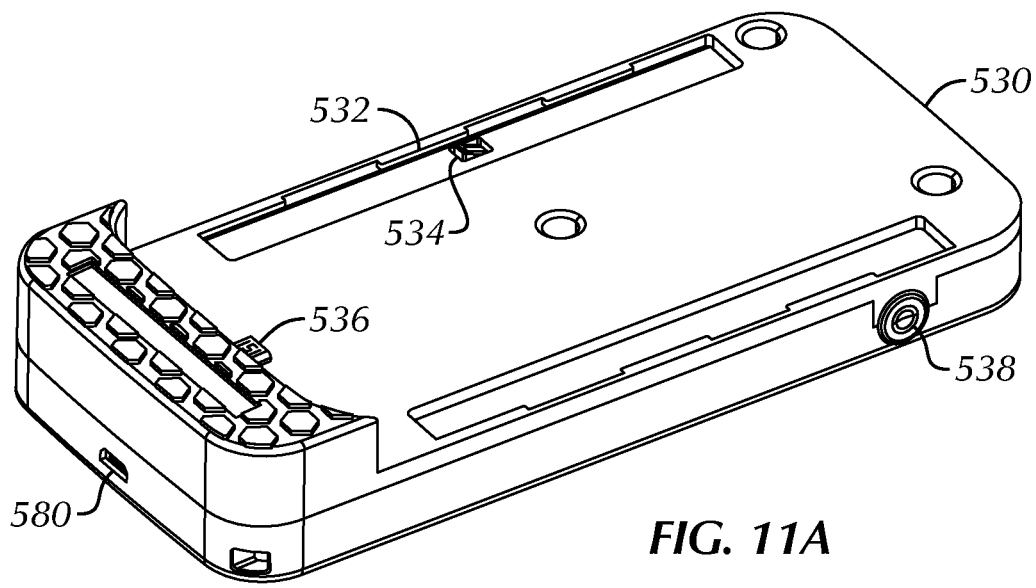
FIG. 11A is a perspective view of a self-defense module.
Figure 11B:
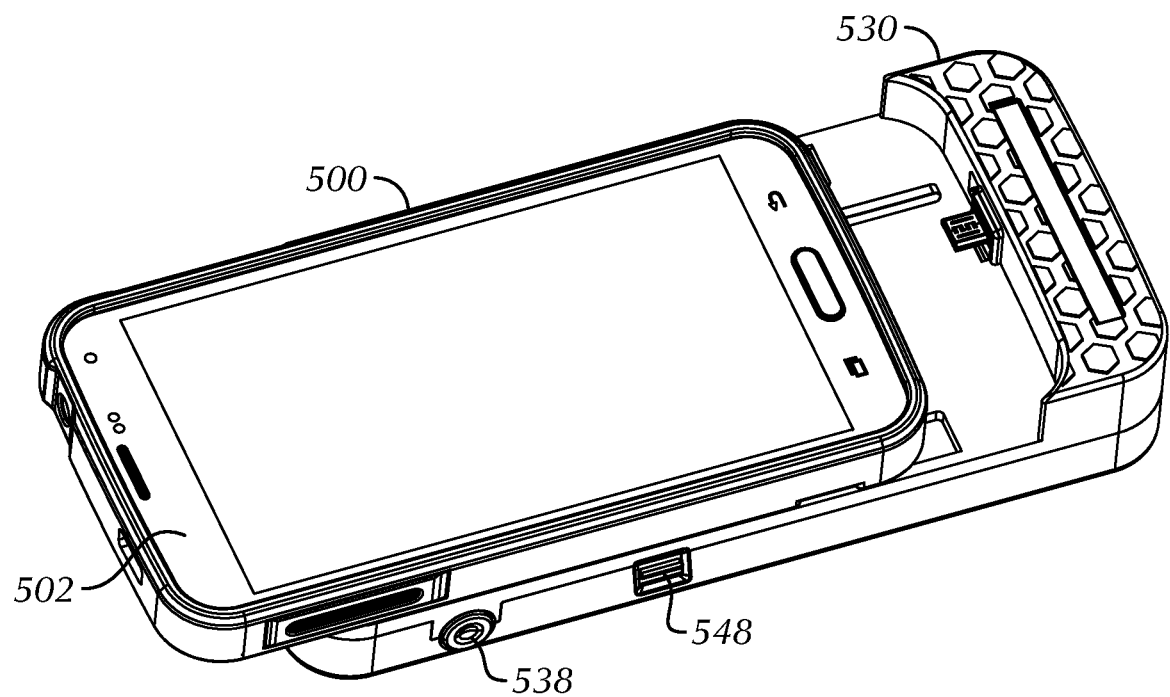
FIG. 11B is a perspective view of a self-defense module and a protective case. A handheld electronic device is shown installed in the protective case.
Figure 11C:
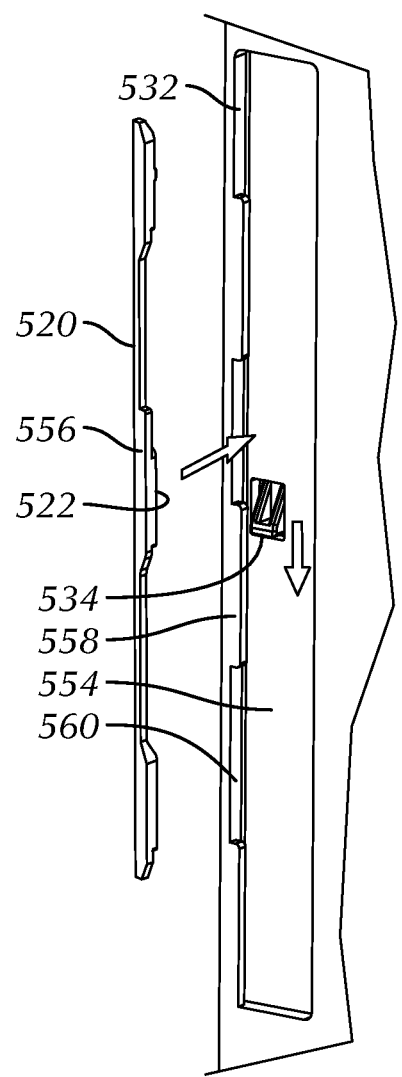
FIG. 11C is an enlarged view of one embodiment of a positive retention means of a protective case and one embodiment of a mated engagement means of a self-defense module.

FIGS. 11A-11C show how the protective case 500 and self-defense module 530 interact and connect to each other. In FIG. 11A, the self-defense module 530 is shown alone, much as it was in FIG. 10A. From this perspective, however, it is easier to see the particular type of engagement means 532 used with this embodiment of the invention. The engagement means 532 in this embodiment may be metal rails or hardened plastic rails, or some combination of the two. The self-defense module locking mechanism 534 is shown as a spring-loaded tab. The charger/comm plug 536 is also shown, as is the charging port 580 for the self-defense module.

In FIG. 11B, a handheld electronic device 502 installed in a protective case 500 is shown being disconnected from a self-defense module 530. The protective case 500 and handheld electronic device 502 are first slid upward along the body of the self-defense module 530. To perform this action, a user must first disengage the self-defense module locking mechanism 534 so that the protective case 500 may move relative to the self-defense module 530. As the protective case moves upward (as illustrated in FIG. 11B), the protective case positive retention means 520 move into a position relative to the self-defense module engagement means 532 that allows the protective case 500 and handheld electronic device 502 to be lifted up and away from the self-defense module 530. The stun gun activation button 538 and a locking mechanism release 548 are also shown in this drawing.

FIG. 11C provides a close-up of one embodiment of the protective case positive retention means 520 and the self-defense module engagement means 532 and locking mechanism 534. The case locking mechanism 522 shown in this figure consists of a tab that extends beyond the rest of the positive retention means 520. This mechanism 522 is designed to slide over and press down on a spring-loaded clip 534 (i.e., the particular embodiment of the locking mechanism shown in this drawing). Once the case locking mechanism 522 (a tab as shown in FIG. 11C) moves past the spring-loaded clip 534, the clip is forced back out by the spring force and this prevents the locking mechanism tab 522 and the protective case 500 from moving relative to the self-defense module 530.

To facilitate this locking action, there are two recessed channels 554 on the face of the self-defense module 530. The rails of the protective case positive retention means 530 have tabs 556 that are mated to self-defense module slots 558 and self-defense module tabs 560. In practice, the protective case 500 is pressed against the face of the self-defense module 530 a certain distance above where the position the case 500 will occupy when the two units are secured together. In this displaced position, the protective case rail tabs 556 slip past the self-defense module slots 558, with allows the protective case 500 and the self-defense module 530 to come into full contact with each other. The protective case 500 is then slid downward (i.e., toward the charger/comm plug 536 shown in FIGS. 11A and 11B). This motion moves the protective case rail tabs 556, which slide under the self-defense module tabs 560 to securely hold the protective case 500 and the self-defense module 530 together. In addition, this downward sliding motion compresses the self-defense module locking mechanism 534 until the protective case 500 is in the proper position, at which point the self-defense module locking mechanism 534 springs back out, and engages with the protective case locking tab 522. This prevents any further motion of the protective case 500 relative to the self-defense module 530.

The release the protective case 500, the self-defense module lock release button 548 is pressed. This button lowers the self-defense module locking mechanism 534, thus allowing the protective case 500 to move relative to the self-defense module 530. The protective case 500 is slid upward (i.e., away from the charger/comm plug 536 shown in FIGS. 11A and 11B), until the protective case rail tabs 536 are clear of the self-defense module tabs 560. At that point the protective case 500 is lifted away from the self-defense module 530. This entire operation can be performed by a user in a few seconds.

The protective case 500 and self-defense module 530 may be secured to each other in any manner that provides a secure connection that a user may make up and unmake in a few seconds. For example, a rotational clip structure could be used. The protective case 500, which would house a handheld electronic device 502, could be placed on the self-defense module 530 at some selected angle from its final position. Generally circular grooves, tabs, or rails could be used on the protective case 500 and the self-defense module 530, such that the case 500 would press against the self-defense module 530 in the initial angularly displaced position. The case 500 would then be rotated into alignment with the self-defense module 530, a motion that would simultaneously create a secure and locked connection between the case 500 and the self-defense module 530.

Alternatively, a combination of a sliding and rotating configuration could be used. The case 500 might initially be positioned at a selected angle from its final position, and also longitudinally displaced from its final position. The case 500 might first be slid into a secondary position, one that provides an initial connection with the self-defense module 530. The case 500 might then be rotated into its final position to complete the connection. These and other means of securing the protective case 500, which houses a handheld electronic device 502, to the self-defense module 530 are well known in the art, and are intended to be included in the scope of the present invention. The longitudinal sliding design shown in the drawings and described above is not meant to be the only manner of connecting the protective case 500 to the self-defense module 530.

Figure 12B:
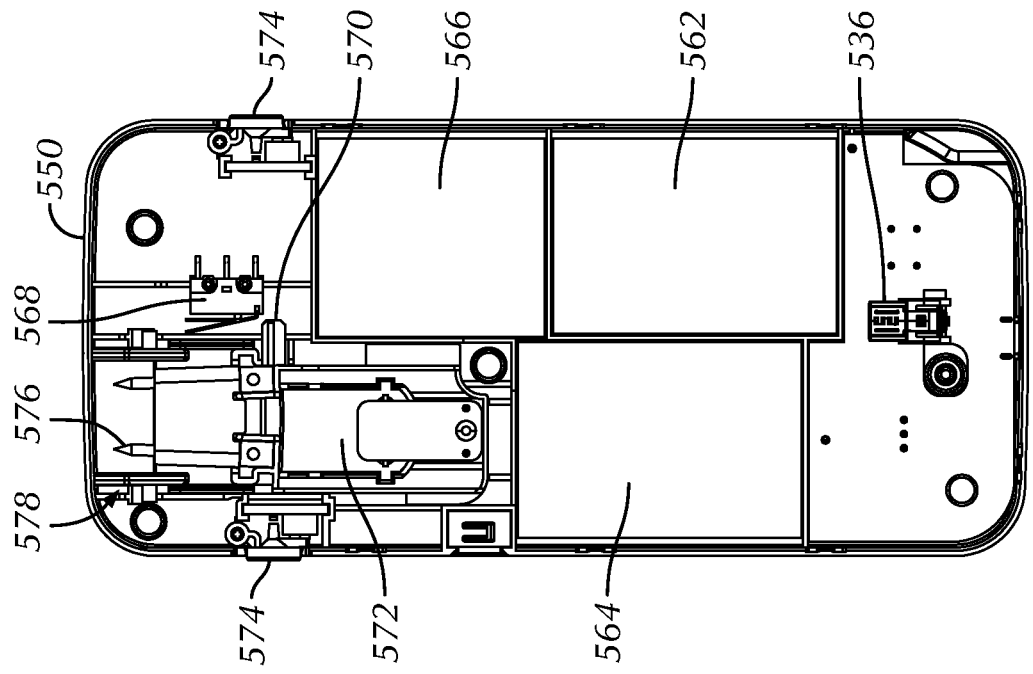
FIGS. 12A and 12B are back and front views, respectively, of a self-defense module with outer covers removed.
Figure 12A:
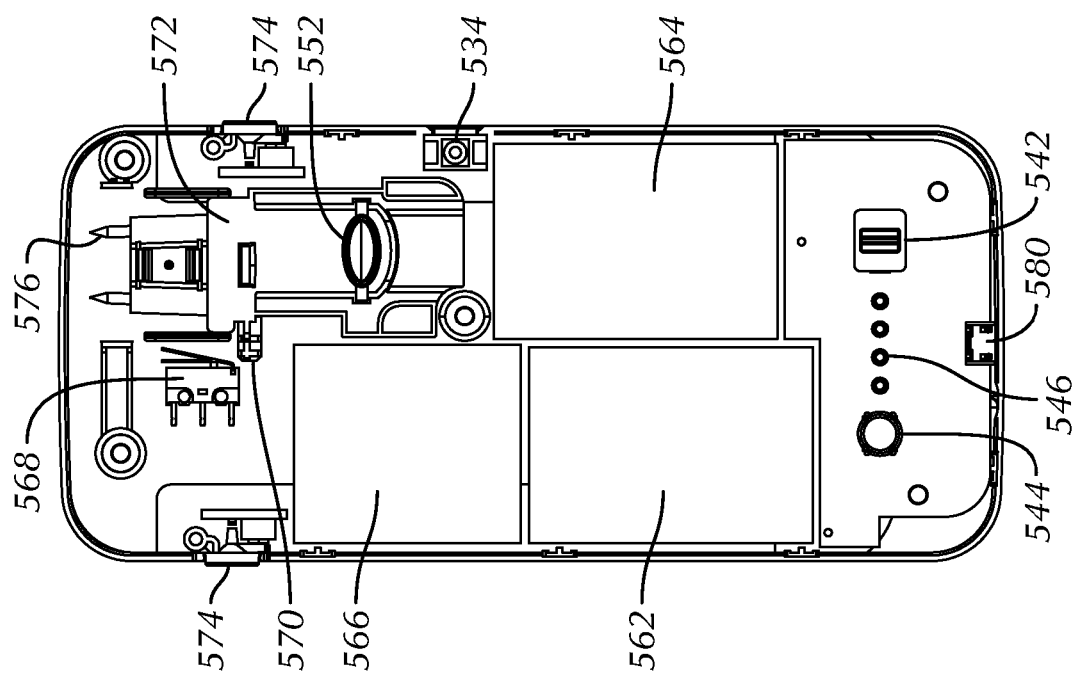

The internal parts of the self-defense module 530 are shown in FIGS. 12A and 12B, which shown the module without its back and front covers, respectively. FIG. 12A, therefore, shows the internals of the self-defense module 530 when viewed from the back. The self-defense module locking mechanism 534 is shown. The circular portion of the mechanism is part of the spring used to bias the mechanism in the direction away from the back of the self-defense module 530. The charger switch 542, charge level button 544, and charge level indicators 546 are shown in FIG. 12A, too. A first battery 562 and second battery 564 and a high voltage generator/controller 566 are all shown in block form. The invention may use a single battery in the self-defense module 530 or a number of batteries. In a preferred embodiment, two batteries are used. This configuration allows use of readily available batteries, while providing adequate electrical capacity to at least partially recharge a handheld electronic device 502 and to operate the stun gun at least one time. A self-defense module charging port 580 is visible in FIG. 12A. This port 580 is used to provide a charge to the self-defense module 530, and via the charger/comm plug 536, to the handheld electronic device 502, as well.

The high voltage generator 566 is a circuit that raises the voltage level from the batteries 562, 564 to a level sufficient for stun gun operations. The batteries 562, 564 supply voltage at about 10 volts or less. The high voltage generator 566 produces an output voltage of 30,000 volts or more. In addition the high voltage generator 566 may also include controller components that ensure the self-defense module 530 properly recharges the handheld electronic device 502, while maintaining sufficient battery capacity to fire the stun gun.

The stun gun components are also visible in FIG. 12A. The probes 576 are shown as a pair of electrical contacts spaced a preselected and fixed distance apart. The probes 576 are shown retracted in FIG. 12A. To use the stun gun, the probes 576 must be extended, and the probe extension slider button 552 is used for this purpose. The slider button 552 is physically moved in the upward direction, thus forcing the probes 576 to extend outward from the self-defense module 530. When the probes 576 are extended, an activation micro switch 568 is switched on by a micro switch activator tab 570 that is connected to the probe slider body 572.

To operate the stun gun of the embodiment shown in these drawings, a user first extends the probes 576 by pushing the slider button 552 in an upward direction. The activation micro switch 568 is turned on, which then makes the dual activation buttons 538 effective. The user depressed both activation buttons simultaneously, and the high voltage generator 566 supplies electrical power to the probes 576. If the probes 576 contact a person's skin when energized, a stunning electrical charge is delivered, which incapacitates the recipient of the charge.

FIG. 12B shows many of the same components, but from the front of the self-defense module 530. The first battery 562, second battery 564, and high voltage generator/controller 566 are all visible. The probe slider body 572 is visible, but the slider button 552 is not, because that item present only on the back of the self-defense module 530. The probes 576 are visible, as are the probe cover retraction mechanism 578. The activation micro switch 568 and the micro switch activator tab 570 are shown in this drawing, too. Finally, the charger/comm plug is visible, as it protrudes from the front side of the self-defense module 530.

Figure 13A:
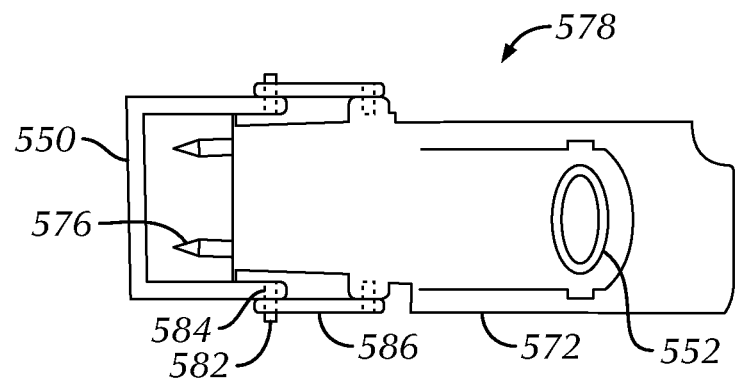
FIGS. 13A and 13B are enlarged views of a probe extension mechanism used in an embodiment of a self-defense module.
Figure 13B:
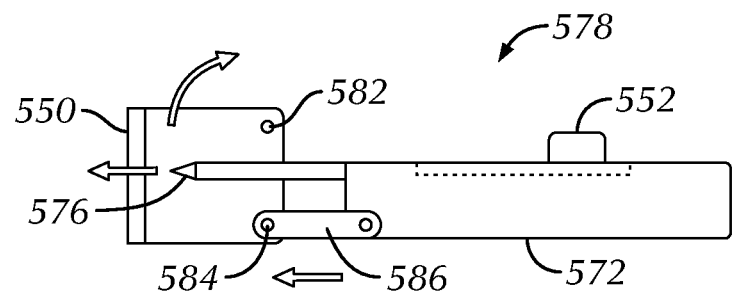

FIGS. 13A and 13B provide a closer look at the probe cover extension/retraction mechanism 578. The slider button 552 and slider body 572 are shown, as is the probe cover 550. The probe cover 550 is connected to other structural components using two pins. A rotation pin 582 provides a pivot point about which the probe cover 550 will rotate. An extension/retraction pin 584, on the other hand, connects the probe cover 550 to an extension/retraction linkage 586, which is then connected to the slider body 572.

When the slider button 552 is pushed in the upward direction, the slider body 572 moves upward, which also moves the extension/retraction linkage 586 in the upward direction. This motion forces one side of the probe cover 550 to move outward, while also rotating around the extension/retraction pin 584. At the same time, the probe cover 550 will rotate around the fixed rotation pin 582. This structure allows the probe cover 550 to pivot out of the way at the same time that the probes 576 are extended for use. The probe cover 550 moves in a manner somewhat similar to that of a garage door as it rotates out of the way of the extended probes 576.

FIG. 13A shows a side view of these components, while FIG. 13 B provides a top view of only the probe cover 550, the extension/retraction linkage 586, and the two pairs of pins: the rotation pins 582 and the extension/retraction pins 584. When the probes 576 are extended, the probe cover 550 rotates out of the way, and when the probes 576 are retracted, the probe cover 550 rotates back to its original position, thus covering and protecting the probes 576.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above. Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, IT 6 will begin with the words "means for.") Accordingly, the applicant reserves the right to add additional claims after filing the application to pursue such additional claim forms for other aspects of the invention.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention. For example, the battery in the housing can charge the electroshock module without electrically coupling to the mobile device when the housing is attached to the mobile device. In another embodiment, the schematics 400 or a portion thereof can be integrated directly into the electronics of the mobile device itself, rather than being external to the mobile device in a housing, and the mobile device can include an application for controlling the electroshock module. In one embodiment, the mobile device can receive a predetermined signal remotely or from the housing to charge and release an electric shock from the electroshock module.

What is claimed is:

1. A self-defense apparatus for use with a handheld electronic device, wherein the apparatus comprises:
    a) a removable protective case configured to fit securely around the handheld electronic device while not obscuring a screen or key controls of the handheld electronic device, and wherein the removable protective case has at least one positive retention means;
    b) a self-defense module configured to be selectively secured to the removable protective case by a user of the handheld electronic device, wherein the self-defense module further comprises:
        i) a self-defense weapon;
        ii) at least one engagement means configured to engage with the positive retention means of the removable protective case in such a manner that when fully engaged, the removable protective case and the self-defense module effectively form a unitary structure; and,
        iii) a locking mechanism configured to retain the engagement means and the positive retention means in full engagement until a user takes positive action to release the locking mechanism, thus allowing the user to separate the removable protective case from the self-defense module.

2. The self-defense apparatus of claim 1 wherein the self-defense weapon is a stun gun.

3. The self-defense apparatus of claim 2 wherein the self-defense module contains a battery with sufficient electrical energy storage capacity to restore at least one-half the full-power capacity of the handheld electronic device while retaining sufficient power to operate the stun gun at least one time.

4. The self-defense apparatus of claim 2 wherein the self-defense module further comprises a battery and high-voltage generator, wherein the high-voltage generator provides a voltage level for the stun gun of at least 20 kV.

5. The self-defense apparatus of claim 1 wherein the self-defense weapon is pepper spray.

6. The self-defense apparatus of claim 1 wherein the self-defense weapon includes an audible alarm.

7. The self-defense apparatus of claim 1 further comprising an application operating on the handheld electronic device that sends an emergency message when the self-defense weapon is enabled.

8. The self-defense apparatus of claim 2 wherein the self-defense module further comprises retractable prongs for the stun gun.

9. The self-defense apparatus of claim 8 wherein the self-defense module further comprises a sliding mechanism for extending and retracting the retractable prongs.

10. The self-defense apparatus of claim 8 wherein the self-defense module further comprises a movable cover over the retractable prongs, such that the movable cover moves out of the way when the retractable prongs are extended and the movable cover returns to its original position when the prongs are retracted.

11. The self-defense apparatus of claim 1 wherein the removable protective case further comprises cutouts for a camera lens, microphone, and speaker.

12. The self-defense apparatus of claim 1 wherein the positive retention means is a notched rail and the engagement means is a recessed channel with tabs mated to the notched rail of the positive retention means.

13. The self-defense apparatus of claim 1 wherein the locking mechanism uses a spring-loaded tab.

14. The self-defense apparatus of claim 2 wherein the self-defense module further comprises two activation buttons that must be simultaneously depressed by a user to activate the stun gun.

15. The self-defense apparatus of claim 2 wherein the self-defense module further comprises at least one activation buttons that lights up when a pair of stun gun probes are extended and armed.

16. The self-defense apparatus of claim 2 wherein the self-defense module further comprises charge indicators configured to indicate the level of the battery charge for the self-defense module, the handheld electronic device, or both.

17. The self-defense apparatus of claim 2 wherein the self-defense module further comprises a charging switch configured to provide electrical energy from the self-defense module to the handheld electronic device.

18. A method of using a self-defense apparatus, the method comprising:
    a) installing a removable protective case on a handheld electronic device;
    b) connecting the removable protective case to a self-defense module such that the removable protective case and the self-defense module form a single working unit, and wherein the self-defense module further comprises a stun gun; and, c) disconnecting the removable protective case from the self-defense module.

* * * * *